(12) United States Patent
Ozaki et al.

(10) Patent No.: US 11,986,959 B2
(45) Date of Patent: May 21, 2024

(54) INFORMATION PROCESSING DEVICE, ACTION DECISION METHOD AND PROGRAM

(71) Applicant: SONY CORPORATION, Tokyo (JP)

(72) Inventors: Natsuko Ozaki, Kanagawa (JP); Jun Yokono, Tokyo (JP); Jianing Wu, Tokyo (JP); Tatsuhito Sato, Kanagawa (JP); Sayaka Watanabe, Tokyo (JP)

(73) Assignee: SONY CORPORATION, Tokyo (JP)

( * ) Notice: Subject to any disclaimer, the term of this patent is extended or adjusted under 35 U.S.C. 154(b) by 652 days.

(21) Appl. No.: 17/259,693

(22) PCT Filed: Jul. 16, 2019

(86) PCT No.: PCT/JP2019/027903
§ 371 (c)(1),
(2) Date: Jan. 12, 2021

(87) PCT Pub. No.: WO2020/022122
PCT Pub. Date: Jan. 30, 2020

(65) Prior Publication Data
US 2021/0316452 A1    Oct. 14, 2021

(30) Foreign Application Priority Data
Jul. 27, 2018 (JP) .................................. 2018-141480

(51) Int. Cl.
*B25J 9/16* (2006.01)
(52) U.S. Cl.
CPC .................................. *B25J 9/163* (2013.01)

(58) Field of Classification Search
None
See application file for complete search history.

(56) References Cited

U.S. PATENT DOCUMENTS

| | | | |
|---|---|---|---|
| 2003/0069863 A1* | 4/2003 | Sadakuni | G06N 3/008 706/11 |
| 2011/0004341 A1 | 1/2011 | Sarvadevabhatla et al. | |
| 2011/0054689 A1 | 3/2011 | Nielsen et al. | |
| 2013/0206177 A1* | 8/2013 | Burlutskiy | G05D 1/0219 15/319 |

(Continued)

FOREIGN PATENT DOCUMENTS

| | | |
|---|---|---|
| JP | 2003-191189 A | 7/2003 |
| JP | 2003-266348 A | 9/2003 |

(Continued)

OTHER PUBLICATIONS

Makino et al., A Study on Using Potential Field for Multiple Agent Cooperative Operation, Transactions on Mathematical Modeling and its Applications, May 2003, pp. 69-81, vol. 44, No. SIG7(TOM8), Information Processing Society of Japan.

*Primary Examiner* — Peter D Nolan
*Assistant Examiner* — Jacob Kent Besteman-Street
(74) *Attorney, Agent, or Firm* — Paratus Law Group, PLLC

(57) ABSTRACT

More natural communication and interaction are enabled. The autonomous system (100) includes an action decision unit (140) that decides, based on an attention level map (40) in which an attention level indicating the degree of attention for each position in a predetermined space is set, the action which a drive mechanism is caused to perform.

20 Claims, 18 Drawing Sheets

(56) References Cited

U.S. PATENT DOCUMENTS

| | | | |
|---|---|---|---|
| 2015/0094879 A1* | 4/2015 | Pari | G05D 1/0276 |
| | | | 701/2 |
| 2015/0207961 A1 | 7/2015 | Gavney, Jr. | |
| 2016/0086023 A1 | 3/2016 | Anabuki et al. | |
| 2017/0100842 A1 | 4/2017 | Le Borgne et al. | |
| 2017/0150026 A1 | 5/2017 | Sen | |
| 2018/0276894 A1* | 9/2018 | Chang | G06F 3/012 |
| 2019/0004520 A1* | 1/2019 | Maeno | G05D 1/0236 |
| 2019/0070735 A1* | 3/2019 | Tappeiner | G10L 17/00 |

FOREIGN PATENT DOCUMENTS

| | | |
|---|---|---|
| JP | 2005-292972 A | 10/2005 |
| JP | 2009-248193 A | 10/2009 |
| JP | 4976903 B2 | 7/2012 |
| JP | 2013-246588 A | 12/2013 |
| JP | 2014-030865 A | 2/2014 |
| JP | 2016-057720 A | 4/2016 |
| WO | WO 2018/047802 A1 | 3/2018 |

* cited by examiner (S106)

FIG.21
(S208)
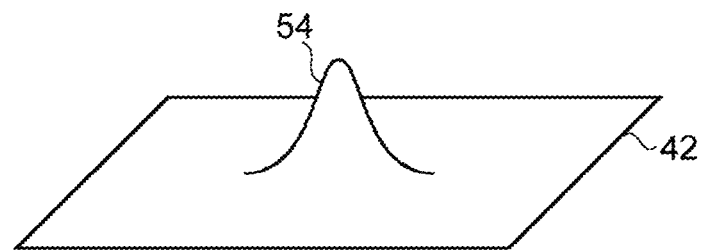
FIG.22
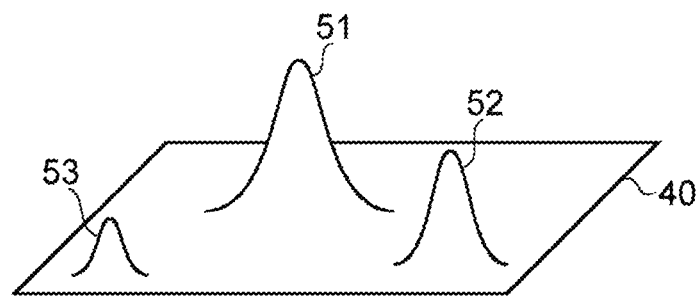
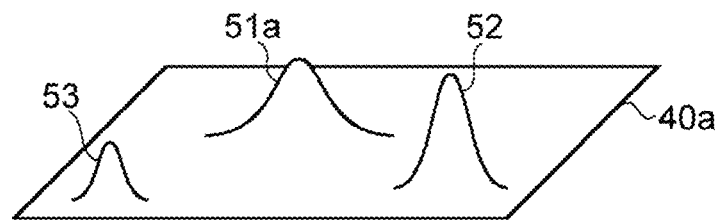

INFORMATION PROCESSING DEVICE, ACTION DECISION METHOD AND PROGRAM

CROSS REFERENCE TO PRIOR APPLICATION

This application is a National Stage Patent Application of PCT International Patent Application No. PCT/JP2019/027903 (filed on Jul. 16, 2019) under 35 U.S.C. § 371, which claims priority to Japanese Patent Application No. 2018-141480 (filed on Jul. 27, 2018), which are all hereby incorporated by reference in their entirety.

FIELD

The present disclosure relates to an information processing device, an action decision method and a program.

BACKGROUND

In recent years, autonomous robots equipped with artificial intelligence, such as robot vacuum cleaners and pet robots at home, and transport robots in factories and distribution warehouses, have been actively developed.

Among them, research and development on autonomous robots that are to be closely related to humans, such as pet robots, humanoid robots, and nursing robots, are being conducted to enable them to perform interactive communication and an interaction according to a user's action, emotion, or the like.

CITATION LIST

Patent Literature

Patent Literature 1: Japanese Laid-open Patent Publication No. 2013-246588 A

SUMMARY

Technical Problem

However, the interaction of the autonomous robot according to the prior art is not yet sufficiently natural, and there are cases where the user feels uncomfortable.

Therefore, the present disclosure proposes an information processing device, an action decision method, and a program that enable more natural communication and interaction.

Solution to Problem

To solve the above-described problem, an information processing device according to one aspect of the present disclosure comprises: an action decision unit that decides, based on an attention level map in which an attention level indicating a degree of attention for each position in a predetermined space is set, an action which a drive mechanism is caused to perform.

(Action) According to an information processing device according to an embodiment of the present disclosure, since the next action of the drive mechanism is decided based on an attention level map, the more accurate action can be taken according to the place or the region of attention. As a result, it is possible to carry out more natural communication and interaction.

Advantageous Effects of Invention

According to the present disclosure, it is possible to carry out more natural communication and interaction. The effects described here are not necessarily limited, and may be any of the effects described in the present disclosure.

BRIEF DESCRIPTION OF DRAWINGS

FIG. 15 is a diagram for explaining step S121 in FIG. 14.

FIG. 16 is a diagram for explaining step S124 in FIG. 14.

FIG. 17 is a diagram for explaining steps S125 and S126 in FIG. 14.

FIG. 21 is a diagram illustrating an example in which the three-dimensional individual attention level map illustrated in FIG. 20 is set as a two-dimensional individual attention level map.

FIG. 22 is a diagram for explaining step S212 in FIG. 18.

DESCRIPTION OF EMBODIMENTS

Figure 1:
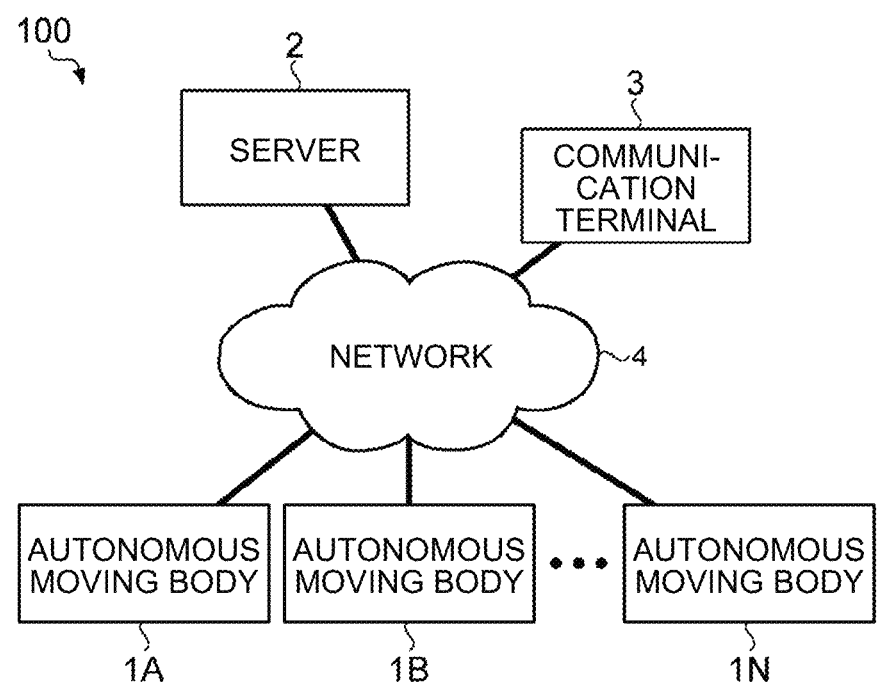
FIG. 1 is a block diagram illustrating a system configuration example of an autonomous system according to an embodiment of the present disclosure.

Hereinafter, the embodiment of the present disclosure will be described in detail with reference to the drawings. In the following embodiments, the same parts are designated by the same reference numerals, so that duplicate description will be omitted.

Further, the present disclosure will be described in the following item order.

1. An embodiment
1.1 Autonomous system configuration example
1.2 Configuration example of autonomous moving body
1.2.1 Example of appearance configuration of autonomous moving body
1.2.1.1 Microphone
1.2.1.2 Camera
1.2.1.3 ToF sensor
1.2.1.4 Motion sensor
1.2.1.5 PSD
1.2.1.6 Touch sensor
1.2.1.7 Illuminance sensor
1.2.1.8 Sole button
1.2.1.9 Inertial measurement unit (IMU)
1.2.2 Example of block configuration of autonomous moving body
1.3 Example of block configuration of autonomous system
1.3.1 Sensor group
1.3.2 Object detection/recognition unit
1.3.3 Attention level map creation/update unit
1.3.4 Action decision unit
1.3.5 Interaction execution unit
1.3.6 Personal identification DB
1.3.7 Attention level map DB
1.3.8 Action rule DB
1.3.9 Specific action rule DB
1.4 Attention level map
1.5 Specific example of autonomous system
1.5.1 Specific example of object detection/recognition unit
1.5.2 Specific example of action decision unit
1.5.3 Specific example of interaction execution unit
1.6 Operation example of autonomous system
1.6.1 Action phase
1.6.1.1 When the autonomous moving body is too close to an attention region and the attention region is not located at the center of the angle of view
1.6.1.2 When the autonomous moving body is too far from an attention region and the attention region is not located at the center of the angle of view
1.6.1.3 Attention region setting process
1.6.1.4 Specific example of attention region setting process
1.6.2 Recognition phase (attention level map creation/update)
1.6.2.1 From attention level attenuation process to adding individual attention level map of the current frame to Existing an attention level map
1.6.3 Other examples of operation of autonomous system
1.7 Example of information used to create attention level map
1.8 Action/effect
1.9 Modification 1. An Embodiment An information processing device, an information processing system, an action decision method, and a program according to an embodiment of the present disclosure will be described in detail below with reference to the drawings.

In the embodiments illustrated below, autonomous systems including autonomous moving bodies equipped with various sensors, such as a domestic pet robot, a humanoid robot, a robot vacuum cleaner, an unmanned aerial vehicle, a follow-up transport robot, and an automobile equipped with an automatic driving function are expected to be application targets. However, the present disclosure is not limited to such autonomous systems, and can be applied to, for example, various devices capable of driving theirs components by autonomous or remote control (including sound generation, light emission, etc.), such as a movable unit such as a robot arm or a manipulator equipped with a drive mechanism, and/or a smart speaker equipped with an interactive communication function, or a system including them.

1.1 Autonomous System Configuration Example

FIG. 1 is a block diagram illustrating a system configuration example of an autonomous system according to an embodiment of the present disclosure. As illustrated in FIG. 1, an autonomous system 100 according to the present embodiment has a configuration in which one or more autonomous moving bodies 1A to 1N are connected to a server 2 via a network 4. The server 2 may be a group of servers composed of a plurality of servers, such as a cloud server. Examples of the network 4 can include various networks such as the Internet, a LAN, and a mobile communication network. In the following description, any one of the autonomous moving bodies 1A to 1N will be described as an autonomous moving body 1.

The user may be able to access the server 2 or the autonomous moving body 1 from a communication terminal 3 such as a smartphone via the network 4. For example, the user may be able to register information about the owner of the autonomous moving body 1 and other predetermined information in the server 2 or the autonomous moving body 1 by using the communication terminal 3.

1.2 Configuration Example of Autonomous Moving Body

Next, a hardware configuration example of the autonomous moving body 1 according to the embodiment of the present disclosure will be described. In the following, a case where the autonomous moving body 1 is a dog-shaped quadruped walking robot will be described as an example.

1.2.1 Example of Appearance Configuration of Autonomous Moving Body

Figure 2:
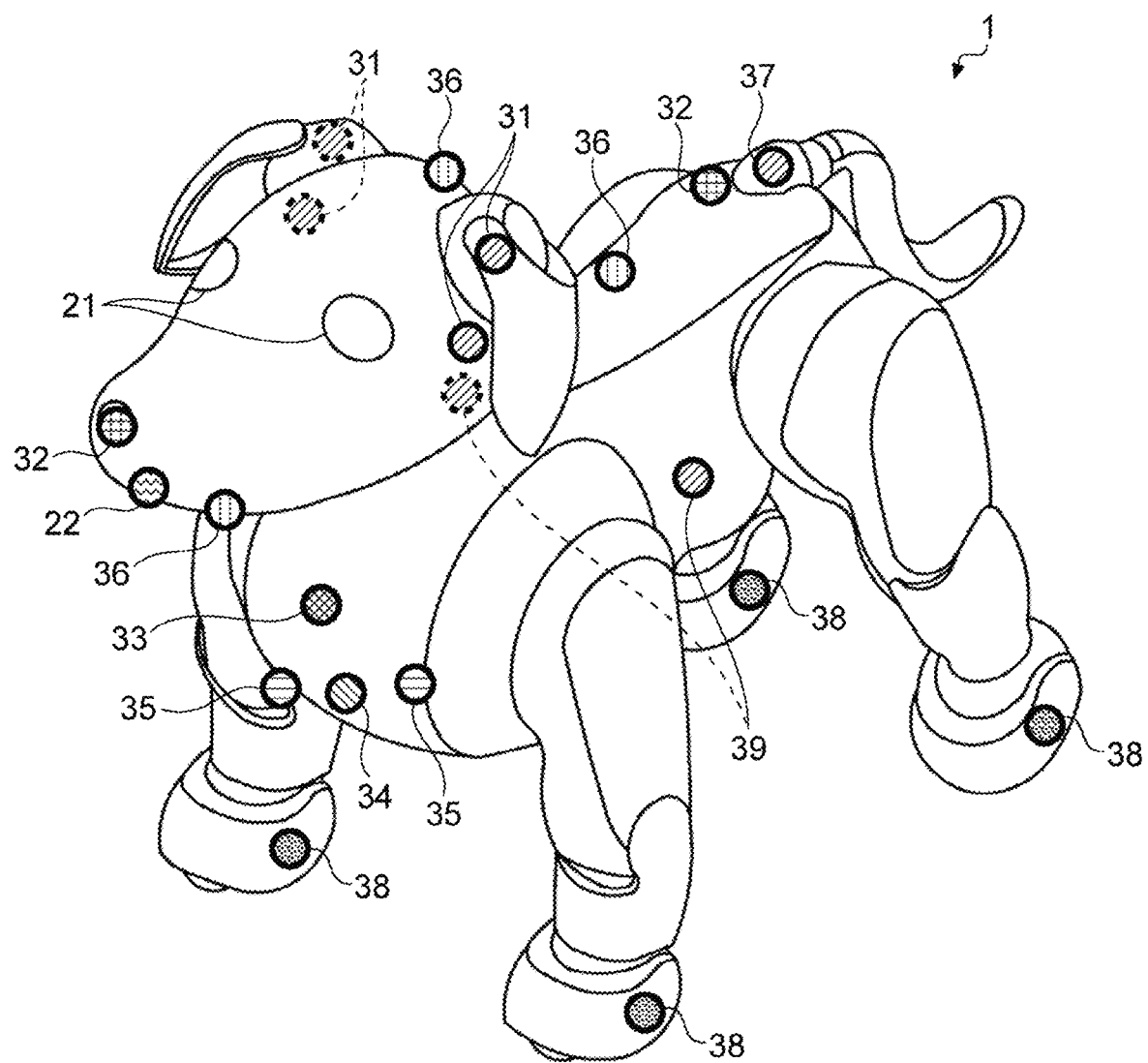
FIG. 2 is a diagram illustrating a hardware configuration example of an autonomous moving body according to the embodiment of the present disclosure.

FIG. 2 is a diagram illustrating a hardware configuration example of the autonomous moving body according to the present embodiment. As illustrated in FIG. 2, the autonomous moving body 1 is a dog-shaped quadruped walking robot having a head (including a neck), a torso, four legs, and a tail. Further, the autonomous moving body 1 includes at least two displays 21 and one or more speakers 22 on the head. The displays 21 correspond to, for example, the eyes, and express various emotions and facial expressions expressed by the eyes. The speaker 22 transmits a bark and various pieces of information to the user by voice.

Further, the autonomous moving body 1 includes various sensors. The autonomous moving body 1 includes, for example, a microphone 31, a camera 32, a time of flight (ToF) sensor 33, a motion sensor 34, a position sensitive detector (PSD) 35, a touch sensor 36, an illuminance sensor 37, a sole button 38, and an inertial measurement unit (IMU) 39.

1.2.1.1 Microphone

The microphone 31 has a function of collecting ambient sounds. The above-mentioned sounds include, for example, user's utterances and surrounding environmental sounds. The autonomous moving body 1 may include, for example, four microphones on the head. By providing a plurality of microphones 31, it is possible to collect a sound generated in the surroundings with high sensitivity and to realize localization of a sound source.

1.2.1.2 Camera

The camera 32 has a function of capturing an image of a user existing around the autonomous moving body 1 (or its drive mechanism) and the surrounding environment. The autonomous moving body 1 may include, for example, two wide-angle cameras at the tip of the nose and the waist. In this case, the wide-angle camera placed at the tip of the nose captures an image corresponding to the front field of view (that is, the dog's field of view) of the autonomous moving body 1, and the wide-angle camera at the waist captures an image of the surrounding region centered on the upper part. The autonomous moving body 1 can extract, based on, for example, an image captured by a wide-angle camera placed on the waist, a feature point of the ceiling, etc. to realize simultaneous localization and mapping (SLAM).

1.2.1.3 ToF Sensor

The ToF sensor 33 has a function of detecting the distance to an object existing in front of the head of the autonomous moving body 1 (or its drive mechanism). The ToF sensor 33 is provided at the tip of the nose of the head. According to the ToF sensor 33, distances to various objects can be detected with high accuracy, and it is possible to realize an operation according to a relative position with an object including a user or an obstacle. In addition, instead of the ToF sensor 33, a depth sensor (also referred to as a depth camera) that acquires a depth map or a depth image may be used.

1.2.1.4 Motion Sensor

The motion sensor 34 has a function of detecting the location of a user or a pet kept by the user existing around the autonomous moving body 1 (or its drive mechanism). The motion sensor 34 is placed, for example, on the chest. According to the motion sensor 34, by detecting an animal body in front of it, it is possible to realize various operations on the animal body, for example, operations according to emotions such as interest, fear, and surprise.

1.2.1.5 PSD

The PSD 35 has a function of acquiring the condition of the front floor face of the autonomous moving body 1 (or its drive mechanism). The PSD 35 is placed, for example, on the chest. According to the PSD 35, the distance of the autonomous moving body 1 to an object existing on the front floor face can be detected with high accuracy, and the operation according to the relative position with the object can be realized.

1.2.1.6 Touch Sensor

The touch sensor 36 has a function of detecting contact by the user. The touch sensor 36 is placed at a portion such as the top of the head, a portion under the chin, or the back where the user is likely to touch the autonomous moving body 1. The touch sensor 36 may be, for example, a capacitance type or pressure sensitive type touch sensor. According to the touch sensor 36, a contact action such as touching, stroking, hitting, or pushing by the user can be detected, and the operation corresponding to the contact action can be performed.

1.2.1.7 Illuminance Sensor

The illuminance sensor 37 detects the illuminance in the space where the autonomous moving body 1 (or its drive mechanism) is located. The illuminance sensor 37 may be placed at the base of the tail on the back face of the head, for example. According to the illuminance sensor 37, it is possible to detect the brightness of the surroundings to perform the operation according to the brightness.

1.2.1.8 Sole Button

The sole button 38 has a function of detecting whether the bottom face of the leg of the autonomous moving body 1 (or its drive mechanism) is in contact with the floor. For this purpose, the sole buttons 38 are placed at the portions corresponding to the paws of the four legs. According to the sole button 38, it is possible to detect contact or non-contact between the autonomous moving body 1 and the floor face, and for example, it is possible to grasp that the autonomous moving body 1 has been picked up by the user.

1.2.1.9 Inertial Measurement Unit (IMU)

The IMU 39 is a 6-axis sensor that detects physical quantities such as speed, acceleration, and rotation of the head and the torso. That is, the IMU 39 detects acceleration and angular velocity on the X-axis, the Y-axis, and the Z-axis. Each of the IMUs 39 is placed on the head and the torso. According to the IMU 39, it is possible to accurately detect the movements of the head and the torso of the autonomous moving body 1 and realize operation control according to the situation.

An example of the sensors provided in the autonomous moving body 1 (or its drive mechanism) according to the present embodiment is described above. The above configuration described with reference to FIG. 2 is merely an example, and the configuration of the sensors that the autonomous moving body 1 can have is not limited to such an example. In addition to the above configuration, the autonomous moving body 1 may further include, for example, various communication devices including a depth sensor, an ultrasonic sensor, a temperature sensor, a geomagnetic sensor, and a global navigation satellite system (GNSS) signal receiver. The configuration of the sensor included in the autonomous moving body 1 can be flexibly modified according to the specifications and operation.

1.2.2 Example of Block Configuration of Autonomous Moving Body

Figure 3:
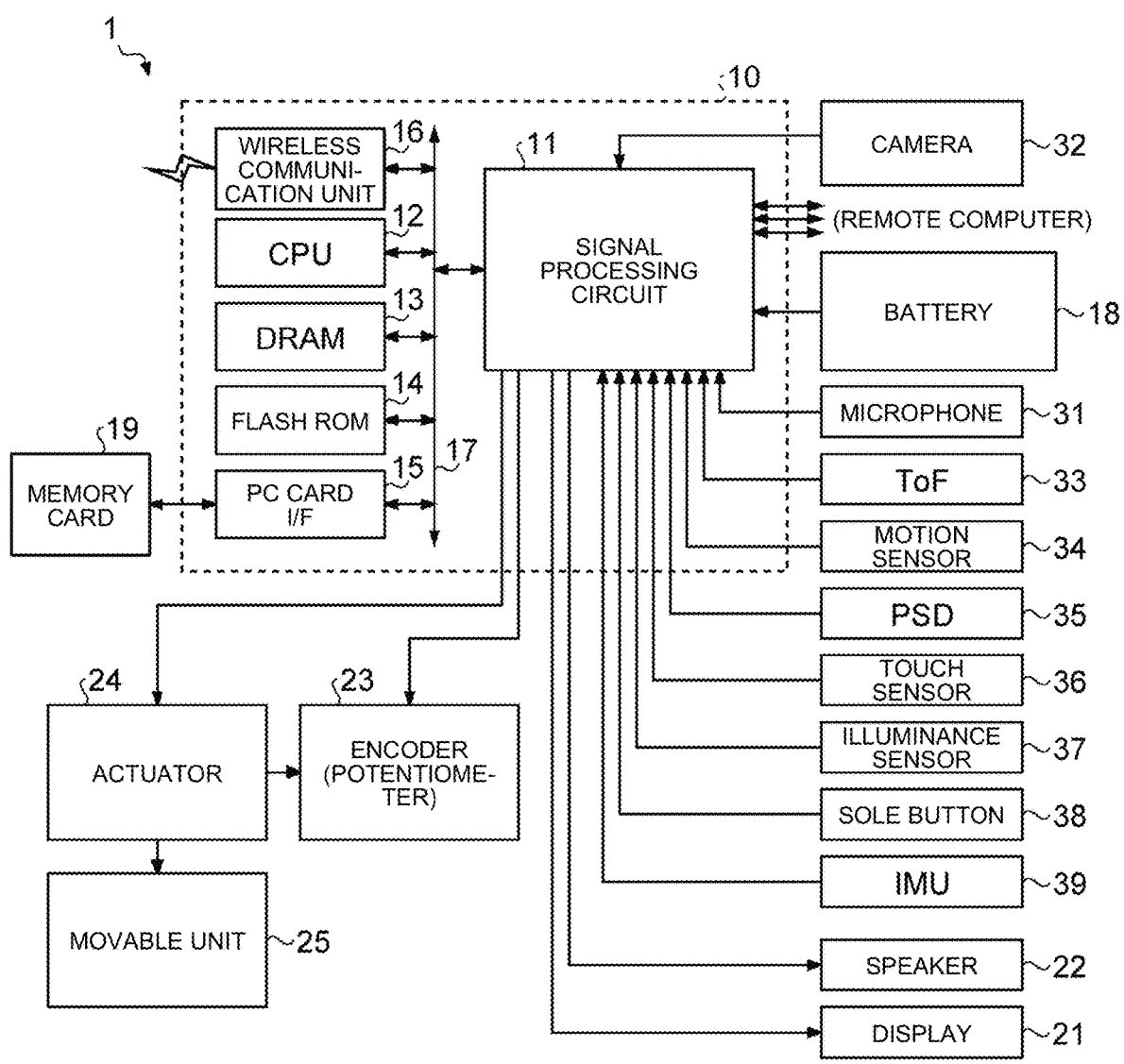
FIG. 3 is a block diagram illustrating a schematic configuration example of the autonomous moving body according to the embodiment of the present disclosure.

FIG. 3 is a block diagram illustrating a schematic configuration example of the autonomous moving body according to the present embodiment. As illustrated in FIG. 3, the autonomous moving body 1 includes, for example, a control unit 10 in addition to the display 21, the speaker 22, and various sensors 31 to 39 illustrated in FIG. 2. The control unit 10 has a configuration in which a central processing unit (CPU) 12, a dynamic random access memory (DRAM) 13, a flash read only memory (ROM) 14, a personal computer (PC) card interface (I/F) 15, a wireless communication unit 16, and a signal processing circuit 11 are connected to each other via an internal bus 17. Further, the autonomous moving body 1 includes a battery 18 as a power source.

In addition, the autonomous moving body 1 includes, as a drive mechanism that controls the position and the attitude, movable units 25 such as joints of a head (neck), a torso, legs and a tail, and an actuator 24 that drives each movable unit 25. This drive mechanism is also a mechanism for realizing the operation required for movement and interaction. Therefore, it can be said that the drive mechanism includes the control unit 10 in addition to the display 21, the speaker 22, and various sensors 31 to 39. Further, the drive mechanism may control, as one of the control of the position and the attitude of the autonomous moving body 1, for example, the zoom and the focus of the camera 32, and the zoom of the microphone 31 independently or in conjunction with the zoom of the camera 32.

In the above configuration, the microphone 31, the camera 32, the ToF sensor 33, the motion sensor 34, the PSD 35, the touch sensor 36, the illuminance sensor 37, the sole button 38, the IMU 39, an encoder 23, and the battery 18 are each connected to the signal processing circuit 11 of the control unit 10.

The signal processing circuit 11 sequentially takes in sensor data, image data, and voice data supplied from the above-mentioned various sensors to sequentially store these at predetermined positions in the DRAM 13 via the internal bus 17. Further, the signal processing circuit 11 sequentially takes in the battery remaining amount data representing the remaining battery amount supplied from the battery 18 together with this to store this at a predetermined position in the DRAM 13.

Each of the sensor data, the image data, the voice data, and the battery remaining amount data stored in the DRAM 13 in this way is used when the CPU 12 controls the operation of the autonomous moving body 1 and at the same time, if necessary, is transmitted to the external server 2 via the wireless communication unit 16. The wireless communication unit 16 may be a communication unit that performs communication with the external server 2 via a predetermined network such as a wireless local area network (LAN) or a mobile communication network in addition to Bluetooth (registered trademark) or Wi-Fi (registered trademark).

For example, at the initial stage when the power of the autonomous moving body 1 is turned on, the CPU 12 reads a control program stored in a memory card 19 loaded in a PC card slot (not illustrated) or a flash ROM 14 via a PC card interface 15 or directly to store this in the DRAM 13.

Further, the CPU 12 determines, based on each of the sensor data, the image data, the voice data, and the battery remaining amount data sequentially stored in the DRAM 13 from the signal processing circuit 11 as described above, conditions of the own autonomous moving body and the surroundings, and whether there is an instruction and an action from the user.

Further, the CPU 12 uses the map data stored in the DRAM 13 or the like or the map data acquired from the external server 2 via the wireless communication unit 16 and various pieces of information to perform the self-position estimation and various operations. For example, the CPU 12 generates, based on action plan information (own autonomous moving body) 105a acquired from the external server 2 via the wireless communication unit 16, a control command 106a to be given to actuator 24 to output it to the actuator 24 via the signal processing circuit 11.

The CPU 12 decides what to do next based on the above-mentioned determination result, the estimated self-position, the control program stored in the DRAM 13, the created or received action plan information, and the like, and performs various actions such as a movement and an interaction by driving the required actuator 24 based on the decision result.

At this time, the CPU 12 may generate voice data as needed to give this to the speaker 22 as a voice signal via the signal processing circuit 11 to output the voice based on the voice signal to the outside. In addition, CPU 12 may generate image data as needed to give this to the display 21 as an image signal via the signal processing circuit 11 to output various pieces of information on the display 21.

In this way, the autonomous moving body 1 is configured to be able to act autonomously in response to the situation of the own autonomous moving body and its surroundings, and instructions and actions from the user.

The autonomous moving body 1 described above is merely an example, and, as described above, may include not only autonomous moving bodies equipped with various sensors, such as a domestic pet robot, a humanoid robot, a robot vacuum cleaner, an unmanned aerial vehicle, a follow-up transport robot, and an automobile equipped with an automatic driving function, but also various autonomous moving bodies that may emit sound by driving their components by autonomous or remote control (including sounding, light emission, etc.), such as a movable unit such as a robot arm or a manipulator equipped with a drive mechanism, and/or a smart speaker equipped with an interactive communication function.

1.3 Example of Block Configuration of Autonomous System

Figure 4:
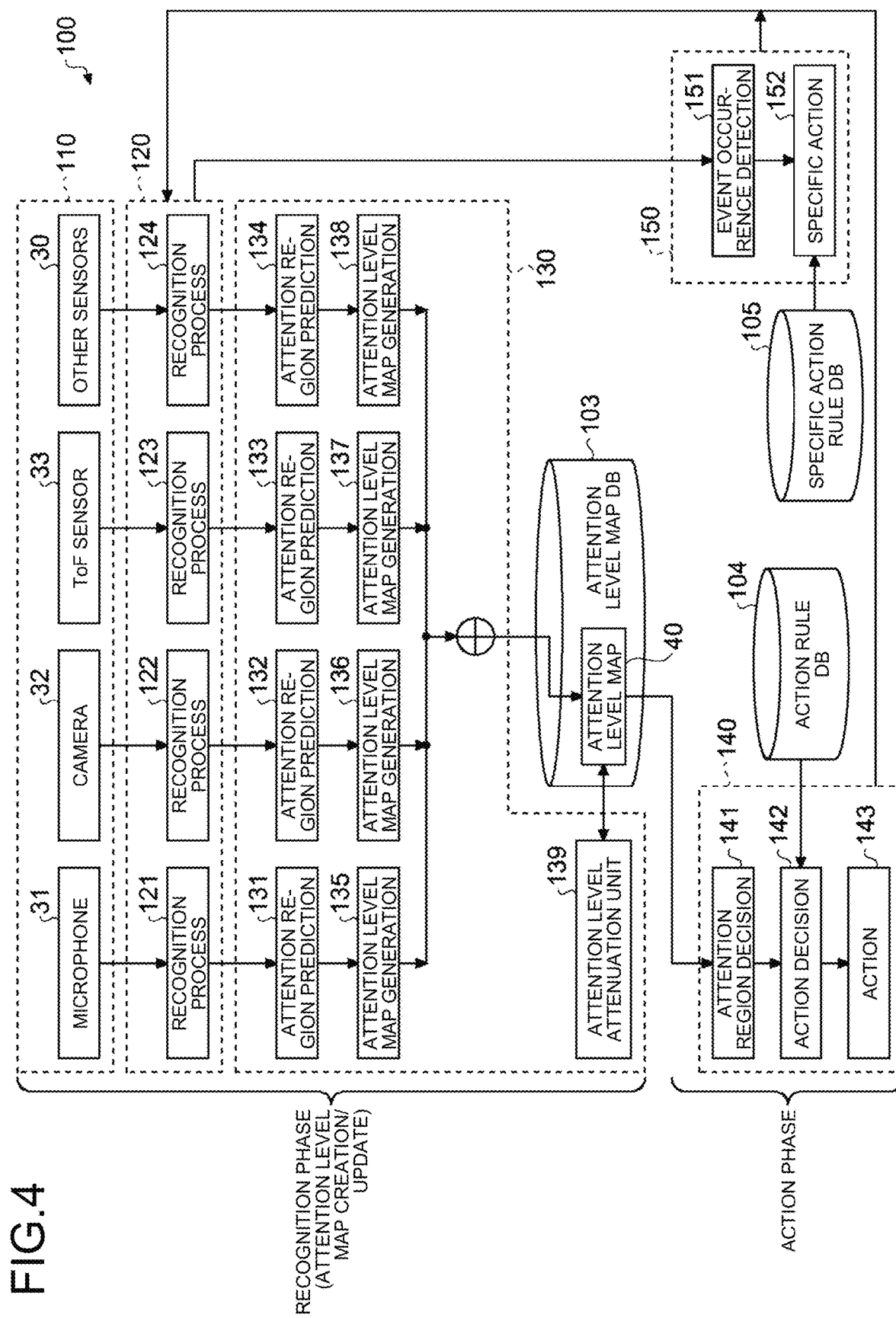
FIG. 4 is a block diagram illustrating an example of a functional block configuration of the autonomous system according to the embodiment of the present disclosure.

FIG. 4 is a block diagram illustrating an example of the functional block configuration of the autonomous system according to the present embodiment. As illustrated in FIG. 4, the autonomous system 100 includes a sensor group 110, an object detection/recognition unit (recognition unit) 120, an attention level map creation/update unit (update unit) 130, an action decision unit 140, an interaction execution unit (execution unit) 150, an attention level map database (DB) 103, an action rule database (DB) 104, and a specific action rule database (DB) 105. Also, although not illustrated in FIG. 4, the autonomous system 100 may include a personal identification database (DB) 102 (see FIG. 6).

In such a configuration, the sensor group 110, the action decision unit 140, and the interaction execution unit 150 are implemented in, for example, the autonomous moving body 1 in FIG. 1. On the other hand, the object detection/recognition unit 120, the attention level map creation/update unit 130, the personal identification DB 102, the attention level map DB 103, the action rule DB 104, and the specific action rule DB 105 are implemented in, for example, the server 2. However, the configuration is not limited to such a configuration, and it is possible to make various modifications such as a configuration in which the sensor group 110, the object detection/recognition unit 120, the attention level map creation/update unit 130, the action decision unit 140, and the interaction execution unit 150 are implemented in the autonomous moving body 1, and, in addition to this, a configuration in which all configurations including the personal identification DB 102, the attention level map DB 103, the action rule DB 104, and the specific action rule DB 105 are implemented in the autonomous moving body 1.

Further, the sensor group 110, the object detection/recognition unit 120, and the attention level map creation/update unit 130 are configured to be used in a stage (this is called the recognition phase) of creating the attention level map, and the action decision unit 140 and the interaction execution unit 150 are configured to be used in a stage (this is called an action phase) where the autonomous moving body 1 actually performs an action.

1.3.1 Sensor Group

The sensor group 110 includes, for example, the microphone 31, the camera 32, the ToF sensor 33, the motion sensor 34, the PSD 35, the touch sensor 36, the illuminance sensor 37, the sole button 38, the IMU 39, and the like described above. For convenience of explanation, in FIG. 4 and the following explanations, the motion sensor 34, PSD 35, touch sensor 36, illuminance sensor 37, sole button 38, IMU 39, etc. are regarded as other sensors 30.

1.3.2 Object Detection/Recognition Unit

The object detection/recognition unit 120 performs recognition processes 121 to 124 on sensor data acquired by each of the microphone 31, the camera 32, the ToF sensor 33, and the other sensors 30 according to the types of sensors and the attributes of each sensor data to output the result to the attention level map creation/update unit 130. The recognition processes 121 to 124 performed by the object detection/recognition unit 120 include for example, a voice recognition process (121) for voice data acquired by the microphone 31, an image recognition process (122) for image data (including moving image data) acquired by the camera 32, an image recognition process (123) for the distance image acquired by the ToF sensor 33, a recognition process 124 for the sensor data acquired by the other sensors 30, and the like.

In addition, in FIG. 4, although the case where the recognition processes 121 to 124 are individually performed for the sensor data acquired by each of the microphone 31, the camera 32, the ToF sensor 33, and the other sensors 30, is illustrated, the configuration is not limited to such a configuration, but may be modified in various ways, such as a way of integrating sensor data acquired by two or more sensors to perform the recognition process on the integrated sensor data.

1.3.3 Attention Level Map Creation/Update Unit

The attention level map creation/update unit 130 performs, based on the result of each of the recognition processes 121 to 124 input from the object detection/recognition unit 120, attention region predictions 131 to 134, respectively, in which the position of the place or the region of attention (hereinafter referred to as the attention region) in a predetermined space is predicted (or estimated). The attention level map creation/update unit 130 performs, based on the result of each of the attention region predictions 131 to 134, attention level map generations 135 to 138 to generate individual attention level maps based on the sensor data obtained by the corresponding sensors 31 to 34 and 30, respectively. The predetermined space may be, for example, each room (a living room, a dining room, a kitchen, a bedroom, a bathroom, etc.) in the case of a house or a condominium, or various spaces such as the entire house, the entire floor, or the entire condominium.

The individual attention level maps generated in the attention level map generations 135 to 138 are added to an attention level map 40 already stored in the attention level map DB 103. As a result, the attention level map 40 in the attention level map DB 103 is sequentially updated to the latest attention level map 40.

Further, the attention level map creation/update unit 130 includes an attention level attenuation unit (attenuation unit) 139. The attention level attenuation unit 139 attenuates the attention level in the attention level map 40 in the attention level map DB 103 according to a predetermined rule each time a predetermined condition is satisfied. For example, the attention level attenuation unit 139 attenuates the attention level of the region (attention region) validated in the action phase described later according to a predetermined rule. Further, the attention level attenuation unit 139 attenuates the attention level of each region in the attention level map 40 according to a predetermined rule in a certain cycle.

1.3.4 Action Decision Unit

The action decision unit 140 is composed of, for example, the control unit 10, the display 21, the speaker 22, the encoder 23, the actuator 24, the movable unit 25, etc. (see FIG. 3) in the autonomous moving body 1, and performs an attention region decision 141 in which the attention region is decided using the attention level map 40, an action decision 142 in which the action of the autonomous moving body 1 is decided according to the information (values of a position, a range, and a peak attention level, etc.) of the decided attention region, and an action 143 in which the decided action is performed. In addition, in the action decision 142, the action decision unit 140 decides the action 143 of the autonomous moving body 1 based on the action rule registered in the action rule DB 104 in which the rule (hereinafter referred to as the action rule) when deciding the action according to the information of the attention region and other conditions, situations, etc. is registered in advance.

1.3.5 Interaction Execution Unit

The interaction execution unit 150 is configured to cause the autonomous moving body 1 to perform interactive communication and interaction according to the user's action, emotion, or the like, and is composed of, for example, the control unit 10, the display 21, the speaker 22, the encoder 23, the actuator 24, the movable unit 25, and the like in the autonomous moving body 1. When detecting the occurrence of a specific event (event occurrence detection 151), the interaction execution unit 150 performs a specific action (interaction) 152 registered in advance in the specific action rule DB 105 according to the type of event that has occurred. The specific action 152 may be interactive communication with the user, an interaction according to the user's action, emotion, or the like.

1.3.6 Personal Identification DB

The personal identification DB 102 stores information for specifying an individual such as the owner of autonomous moving body 1 from, for example, a voiceprint specified by performing the recognition process 121 on the voice data acquired by the microphone 31, a face recognized by performing the recognition process 122 on the image data acquired by the camera 32, and the like.

1.3.7 Attention Level Map DB

The attention level map 40 is stored in the attention level map DB 103. For example, the attention level map 40 is stored in the attention level map DB 103 updated based on the latest sensor data. Further, the attention level map DB 103 may accumulate the attention level map before the update as a history in chronological order.

1.3.8 Action Rule DB

As described above, the action rule when deciding the action to be performed by the autonomous moving body 1 is stored in the action rule DB 104 in advance according to the information of the eye region (values of a position, a range, and a peak attention level, etc.) and other conditions, situations, etc. Here, examples of the action rule include a rule that "(autonomous moving body 1) moves away from the attention region when it is determined, based on the distance from the autonomous moving body 1 to the attention region and the size of the attention region, that the entire attention region cannot be kept within the angle of view of the camera 32", a rule that "(autonomous moving body 1) moves closer to the attention region when it is determined, based on the distance from the autonomous moving body 1 to the attention region and the size of the attention region, that the size of the attention region is too small for the angle of view of the camera 32", a rule to "control the roll angle (R), the pitch angle (P), the yaw angle (Y), etc. of the camera 32 so that the attention region is located at the center of the field of view (angle of view) of the camera 32 when the attention region is out of the field of view (angle of view) of the camera 32", and the like. However, it goes without saying that the action rules are not limited to these action rules, and various modifications and additions are possible.

1.3.9 Specific Action Rule DB

A specific action to be performed by the autonomous moving body 1 is registered in advance in the specific action rule DB 105 according to the type of the event that has occurred. The specific action 152 may be interactive communication with the user, an interaction according to the user's action, emotion, or the like.

1.4 Attention Level Map

Figure 5:
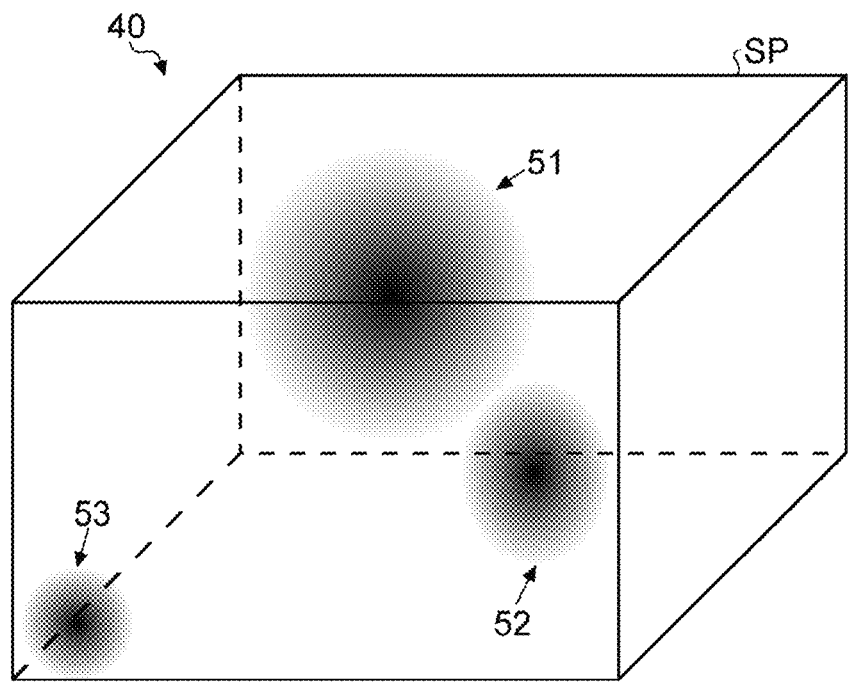
FIG. 5 is a schematic diagram illustrating an example of an attention level map according to the embodiment of the present disclosure.

FIG. 5 is a schematic diagram illustrating an example of the attention level map according to the present embodiment. The attention level map 40 has a configuration in which, for example, the attention level distribution is set for a predetermined space SP which is a three-dimensional space. More specifically for example, the predetermined space SP of the attention level map 40 is, for example, a three-dimensional grid map in which box cells are three-dimensionally combined, and a value of the attention level is set for each box cell. The shapes of the distributions 51 to 53 near the local peak of the attention level in the attention level map 40 may be approximated to, for example, a three-dimensional Gaussian distribution. However, the map is not limited to the three-dimensional attention level map 40, but can be a two-dimensional attention level map or the like.

1.5 Specific Example of Autonomous System

Figure 6:
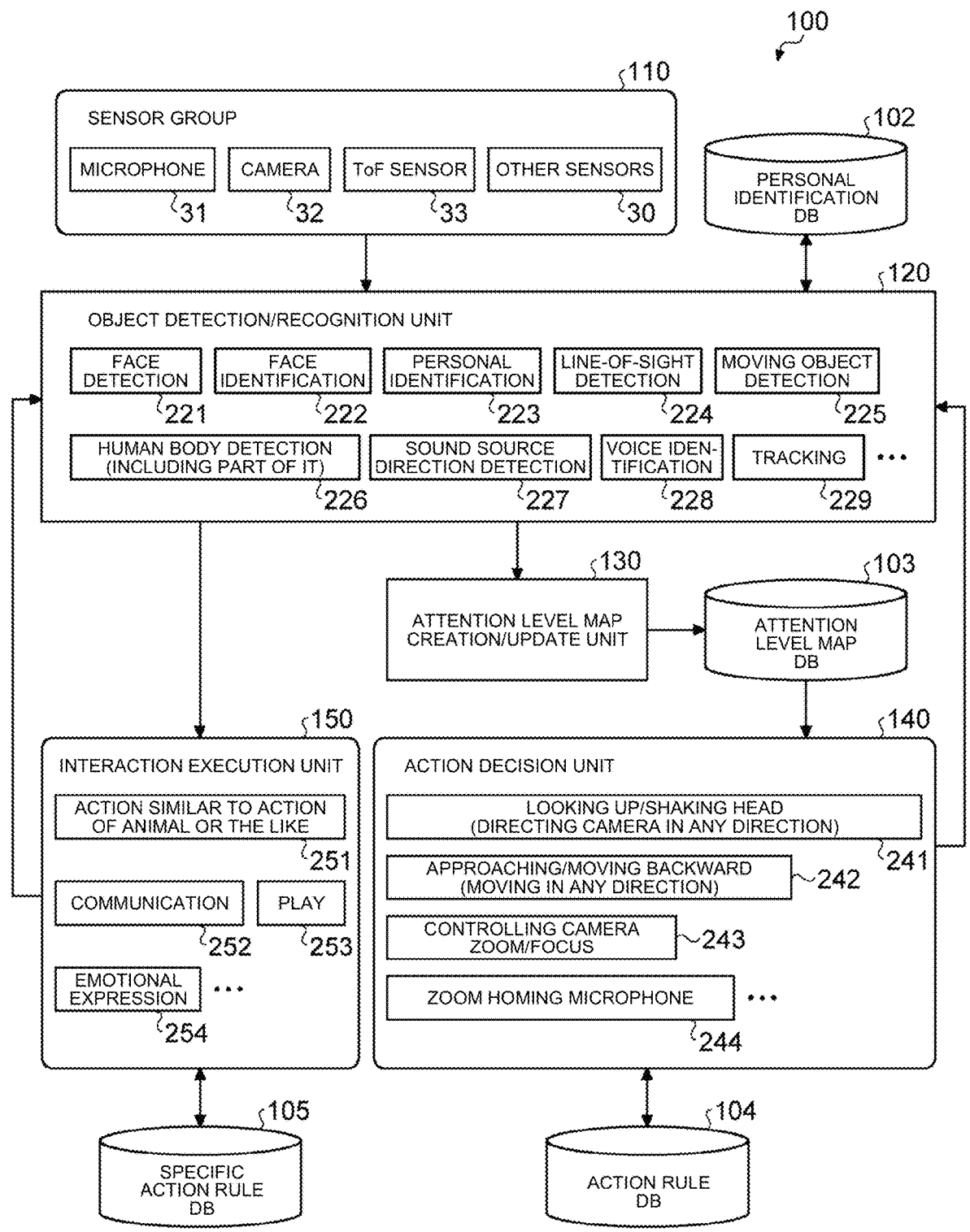
FIG. 6 is a block diagram illustrating a schematic configuration example of an autonomous system in which the autonomous system illustrated in FIG. 4 is more specified.

Next, the autonomous system 100 according to the present embodiment will be described more specifically. FIG. 6 is a block diagram illustrating a schematic configuration example of an autonomous system in which the autonomous system illustrated in FIG. 4 is more specified.

1.5.1 Specific Example of Object Detection/Recognition Unit

As can be seen by comparing FIG. 6 and FIG. 4, in the configuration illustrated in FIG. 6, specific examples of the process performed by the object detection/recognition unit 120 include a face detection 221, a face identification 222, a personal identification 223, a line-of-sight detection 224, a moving object detection 225, a human body detection (including part of it) 226, a sound source direction detection 227, a voice identification 228, a tracking 229, and the like.

The face detection 221 may be a process of, for example, detecting a region of a person's face included in the image data acquired by the camera 32.

The face identification 222 may be a process of, for example, recognizing a feature such as a face shape from a face region detected by the face detection 221.

The personal identification 223 may be a process of, for example, specifying an individual having the face by referring to the personal identification DB 102 based on the features of the face specified by the face identification 222.

The line-of-sight detection 224 may be a process of, for example, detecting the direction of the person's line of sight, for example, the direction to which the person is paying attention, based on the features of the face specified by the face identification 222.

The moving object detection 225 may be a process of, for example, detecting a moving object such as a ball included in the image data acquired by the camera 32.

The human body detection (including part of it) 226 may be a process of, for example, detecting the human body and a part thereof (arms, legs, etc.) included in the image data acquired by the camera 32.

The sound source direction detection 227 may be a process of, for example, detecting the position, the direction, and the like of the sound source from the voice data acquired by the microphone 31.

The voice identification 228 may be a process of, for example, identifying a sound source (a human, an animal, an inorganic substance, an organic substance, etc.) or the like from the voice data acquired by the microphone 31. For example, when the sound source is a human, the voice data may be a human voice, and the process may be a process of detecting the voiceprint or the like.

The tracking 229 may be a process of, for example, tracking the movement of a person or an object included in the image data acquired by the camera 32, or may be a process of, for example, tracking the movement of a sound source specified from the voice data acquired by the microphone 31.

1.5.2 Specific Example of Action Decision Unit

Specific examples of the action performed by the action decision unit 140 include looking up/shaking head (directing the camera in any direction) 241, approaching/moving backward (moving in any direction) 242, controlling camera zoom/focus 243, zoom homing microphone 244, etc. Here, the looking up/shaking head (directing the camera in any direction) 241 corresponds to the action rule to "control the roll angle (R), the pitch angle (P), the yaw angle (Y), etc. of the camera 32 so that the attention region is located at the center of the field of view (angle of view) of the camera 32 when the attention region is out of the field of view (angle of view) of the camera 32" as mentioned above. In addition, the approaching/moving backward (moving in any direction) 242 corresponds to the action rule that "(autonomous moving body 1) moves away from the attention region when it is determined, based on the distance from the autonomous moving body 1 to the attention region and the size of the attention region, that the entire attention region cannot be kept within the angle of view of the camera 32", and the action rule that "(autonomous moving body 1) moves closer to the attention region when it is determined, based on the distance from the autonomous moving body 1 to the attention region and the size of the attention region, that the size of the attention region is too small for the angle of view of the camera 32" as mentioned above. The controlling camera zoom/focus 243 may correspond to the action rule to, for example, "control the zoom and focus of the camera 32 when the distance from the autonomous moving body 1 to the attention region changes". In addition, the zoom homing microphone 244 may correspond to the action rule to, for example, "control the zoom of the microphone 31 in conjunction with the zoom of the camera 32 when the zoom of the camera 32 is changed". However, the action rules are not limited to these action rules, and various modifications may be made.

The actions performed by the action decision unit 140, for example, the looking up/shaking head (directing the camera in any direction) 241, the approaching/moving backward (moving in any direction) 242, the controlling camera zoom/focus 243, and the zoom homing microphone 244 may be performed separately, or may be performed at the same time. For example, the action decision unit 140 may cause the autonomous moving body 1 to move closer to the attention region (242) and look up (241).

1.5.3 Specific Example of Interaction Execution Unit

Specific examples of the specific action (interaction) 152 performed by the interaction execution unit 150 may include an action similar to that of an animal or a creature (hereinafter referred to as an animal or the like) 251, communication 252 with a user such as a human, a play such as a human imitation (including joint mapping), a singing imitation (including voice imitation), and a ball play 253, an emotional expression 254 such as laughing, taking pleasure, getting angry, and crying, and the like. As a result, the interaction execution unit 150 can cause the autonomous moving body 1 to perform, for example, an action to express joy when the owner of the autonomous moving body 1 is identified, and an action to play with a ball when the ball is recognized.

Examples of the action similar to action of an animal or the like 251 include, for example, "looking up when there is a foot", "looking back when there is a sound", "checking what is cared about in order", "checking an object by approaching it when it is not possible to see it clearly", "reacting to the movement of the other entity", "looking in the same direction as a person's line-of-sight", "may not respond to a call from another if absorbed", and the like. The interaction execution unit 150 performs the action 251 as the specific action (interaction) 152, so that it is possible to make the autonomous moving body 1 act to express curiosity.

Examples of the communication 252 may include, for example, "whimpering and approaching when called by the owner (owner)", "approaching when hearing hands being clapped", "eye contacting when spoken", "showing tummy when stroked", and the like. The interaction execution unit 150 performs the communication 252 as a specific action (interaction) 152, so that it is possible for the autonomous moving body 1 to perform communication with the user, such as the user calling the autonomous moving body 1 or having a conversation with the autonomous moving body 1. In addition, the interaction execution unit 150 performs the communication 252 as the specific action (interaction) 152 to increase the number of times the autonomous moving body 1 finds a face, a human, and an object, so that it is possible to increase the number of opportunities at which the autonomous moving body 1 performs an interaction.

Examples of the play 253 may include, for example, "chasing when the ball is thrown", "kicking the ball against the opponent", "following when the owner runs", and the like. The interaction execution unit 150 performs the play 253 as the specific action (interaction) 152, so that the user can play with the autonomous moving body 1 using a play tool such as a ball.

Examples of the emotional expression 254 may include, for example, "shaking the tail when the owner (owner) is found", "lying down when being about to be hit", "lowering the tail when scolded", and the like. The interaction execution unit 150 performs the emotional expression 254 as the specific action (interaction) 152, so that it is possible to make the autonomous moving body 1 act as if it had an ego.

1.6 Operation Example of Autonomous System

Next, an operation example of the autonomous system 100 according to the present embodiment will be described in detail with reference to the drawings. In the following, for simplicity of explanation, the sensor used is the camera 32, and the operation performed by the autonomous system 100 with respect to the image data acquired by the camera 32 is illustrated.

Figure 7:
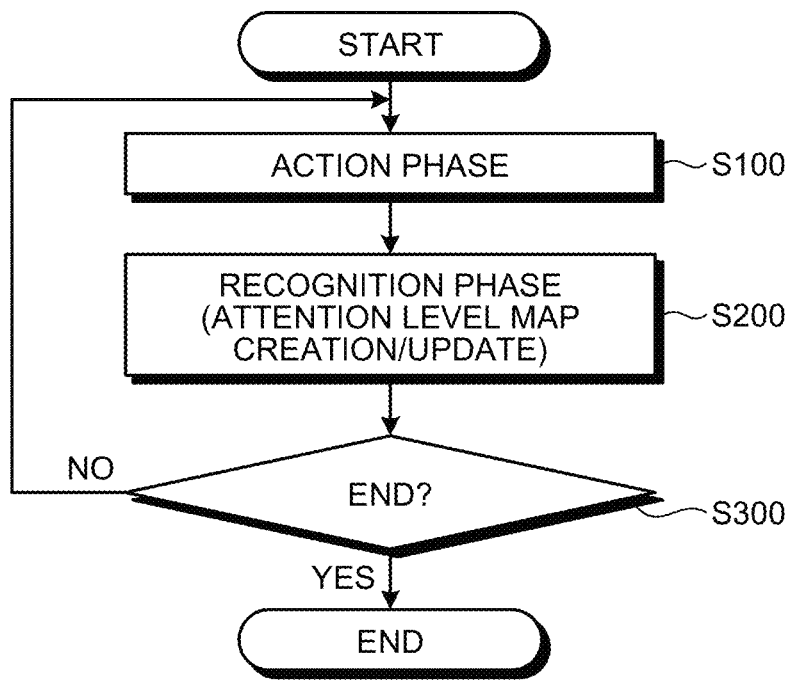
FIG. 7 is a flowchart illustrating an example of an overall schematic operation of the autonomous system according to the embodiment of the present disclosure.

FIG. 7 is a flowchart illustrating an example of the overall schematic operation of the autonomous system according to the present embodiment. As illustrated in FIG. 7, in this operation, the action phase (step S100) and the recognition phase (attention level map creation/update) (step S200) are repeatedly performed (NO in step S300) until the predetermined end condition is satisfied (YES in step S300). The order of the action phase (step S100) and the recognition phase (attention level map creation/update) (step S200) may be reversed.

In the action phase of step S100, each step is performed by the action decision unit 140. In the recognition phase (attention level map creation/update) of step S200, each step is performed by the sensor group 110, the object detection/recognition unit 120, the attention level map creation/update unit 130, or the interaction execution unit 150.

1.6.1 Action Phase

Figure 8:
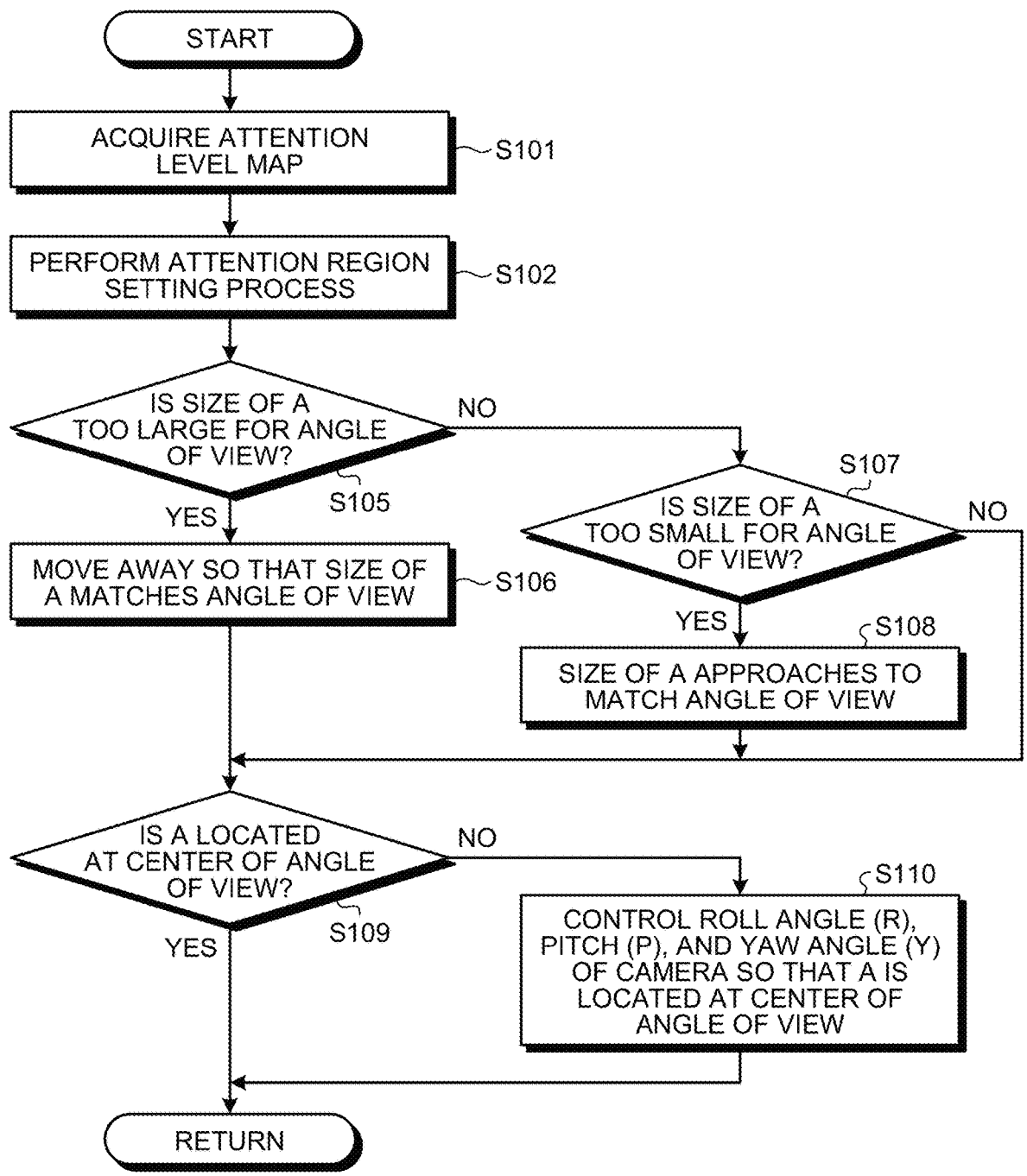
FIG. 8 is a flowchart illustrating an example of a flow of an action phase according to the embodiment of the present disclosure.

First, the action phase illustrated in step S100 of FIG. 7 will be described in detail with reference to the drawings. FIG. 8 is a flowchart illustrating an example of the flow of the action phase according to the present embodiment. As illustrated in FIG. 8, in the action phase, the action decision unit 140 first acquires the latest attention level map 40 from the attention level map DB 103 (step S101). Subsequently, the action decision unit 140 performs the attention region setting process for setting an attention region A with respect to the attention level map 40 (step S102). The details of the attention region setting process will be described later.

Figure 9:
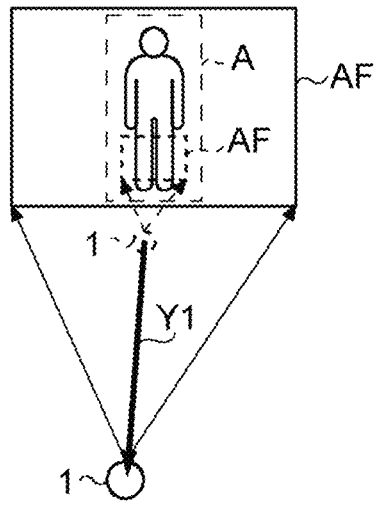
FIG. 9 is a diagram for explaining the operation of step S106 in FIG. 8.

Next, the action decision unit 140 determines, based on the distance from the autonomous moving body 1 to the attention region A and the size of the attention region A, whether the size of the attention region A is too large for the angle of view of the camera 32 (step S105), and when it is not too large (NO in step S105), the process proceeds to step S107. On the other hand, when the size of the attention region A is too large (YES in step S105), the action decision unit 140 can refer to the action rule DB 104 to decide the action to "move away from the attention region A so that the size of the attention region A matches the angle of view of the camera 32" to perform the decided action. As a result, as illustrated by arrow Y1 in FIG. 9, the autonomous moving body 1 moves away (moves backward) from the attention region A so that the attention region A is kept well within an angle of view AF of the camera 32 (step S106 in FIG. 8). After that, the action decision unit 140 proceeds to step S109.

Figure 10:
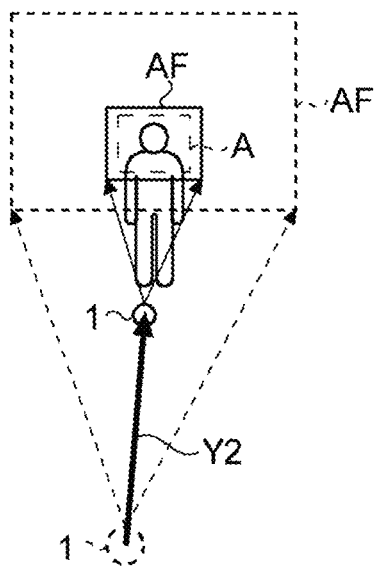
FIG. 10 is a diagram for explaining the operation of step S108 in FIG. 8.

In step S107, the action decision unit 140 determines, based on the distance from the autonomous moving body 1 to the attention region A and the size of the attention region A, whether the size of the attention region A is too small for the angle of view of the camera 32, and when it is not too small (NO in step S107), the process proceeds to step S109. On the other hand, when the size of the attention region A is too small (YES in step S107), the action decision unit 140 can refer to the action rule DB 104 to decide the action to "move closer to the attention region A so that the size of the attention region A matches the angle of view of the camera 32" to perform the decided action. As a result, as illustrated by arrow Y2 in FIG. 10, the autonomous moving body 1 moves closer to the attention region A so that the attention region A is kept well within an angle of view AF of the camera 32 (step S108 in FIG. 8). After that, the action decision unit 140 proceeds to step S109.

Whether the size of the attention region A is too large for the angle of view AF of the camera 32, or, whether it is too small may be determined based on how much ratio this angle range has relative to the angle of view of the camera 32 by calculating, based on the distance from autonomous moving body 1 to attention region A and the size of attention region A, the angle range (vertical direction and horizontal direction) of the attention region A as seen from the camera 32.

The explanation is made using a specific example. For example, when the angle range of at least one of the vertical direction and the horizontal direction of the attention region A as seen from the camera 32 is larger than the angle of view of the camera 32 or the first ratio to the angle of view (for example, 80% of the angle of view), the action decision unit 140 may determine that the size of the attention region A with respect to the angle of view of the camera 32 is too large (YES in step S105), and if this is not the case, may determine that it is not too large (NO in step S105).

Similarly, for example, when the angle range of at least one of the vertical direction and the horizontal direction of the attention region A as seen from the camera 32 is less than the angle of view of the camera 32 or the second ratio to the angle of view (for example, 10% of the angle of view), the action decision unit 140 may determine that the size of the attention region A with respect to the angle of view of the camera 32 is too small (YES in step S107), and if this is not the case, may determine that it is not too small (NO in step S107).

Taking into consideration the error in the position/attitude of the autonomous moving body 1, the efficiency in keeping the attention region A within the angle of view, and the like, the first ratio may be a value that can be set to have a certain margin with respect to the angle of view. Further, the second ratio may be set based on whether an object (for example, a face) in the attention region A can be recognized from the image data acquired by the camera 32. In this case, for example, the second ratio is set to a relatively small value when the camera 32 has a high resolution, and the second ratio is set to a relatively large value when the camera 32 has a low resolution.

Figure 11:
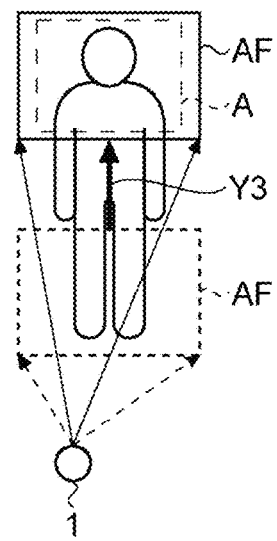
FIG. 11 is a diagram for explaining the operation of step S110 in FIG. 8.

In step S109, the action decision unit 140 determines whether the attention region A is located at the center or substantially the center of the angle of view of the camera 32. For example, the action decision unit 140 determines whether the center of the attention region A or the position having the highest attention level in the attention region A is located at the center or substantially the center of the angle of view of the camera 32. When the attention region A is located at the center or substantially the center of the angle of view of the camera 32 (YES in step S109), this operation returns to the operation illustrated in FIG. 7. On the other hand, when the attention region A is not located at the center or substantially the center of the angle of view of the camera 32 (NO in step S109), the action decision unit 140 can refer to the action rule DB 104 to decide the action to "control the roll angle (R), the pitch angle (P), the yaw angle (Y), etc. of the camera 32 so that the center of the attention region A, or the position with the highest attention level in the attention region A is located at the center or substantially the center of the angle of view of the camera 32" to perform this decided action. As a result, as illustrated by arrow Y3 in FIG. 11, the roll angle (R), the pitch angle (P), the yaw angle (Y), etc. of the camera 32 are controlled to move the angle of view AF of the camera 32 so that the center of the attention region A, or the position with the highest attention level in the attention region A is located at the center or substantially the center of the angle of view AF of the camera 32 (step S110 in FIG. 8). After that, this operation returns to the operation illustrated in FIG. 7.

Figure 12:
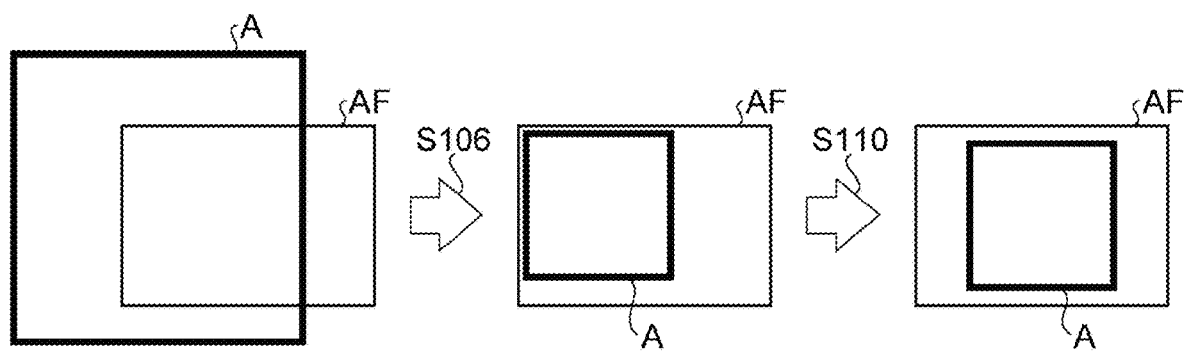
FIG. 12 is a diagram for explaining the operation of YES in step S105 to S110 of FIG. 8.

1.6.1.1 when the Autonomous Moving Body is Too Close to an Attention Region and the Attention Region is not Located at the Center of the Angle of View Here, the operation when the autonomous moving body 1 is too close to the attention region A and the attention region is not located at the center of the angle of view, that is, the operation of YES in step S105 to S110 of FIG. 8, will be described with reference to FIG. 12. As illustrated in FIG. 12, when the autonomous moving body 1 is too close to the attention region A, it is determined that the size of the attention region A is too large for the angle of view of the camera 32 (YES in step S105). In this case, by performing the action decided by the action decision unit 140, the autonomous moving body 1 moves away (moves backward) from the attention region A so that the attention region A is kept well within the angle of view AF of the camera 32 (step S106).

Then, it is determined that the attention region A is not located at the center or substantially the center of the angle of view of the camera 32 (NO in step S109). For this determination, by performing the action decided by the action decision unit 140, the roll angle (R), the pitch angle (P), the yaw angle (Y), etc. of the camera 32 are controlled so that the center of the attention region A, or the position with the highest attention level in the attention region A is located at the center or substantially the center of the angle of view AF of the camera 32, (step S110).

Figure 13:
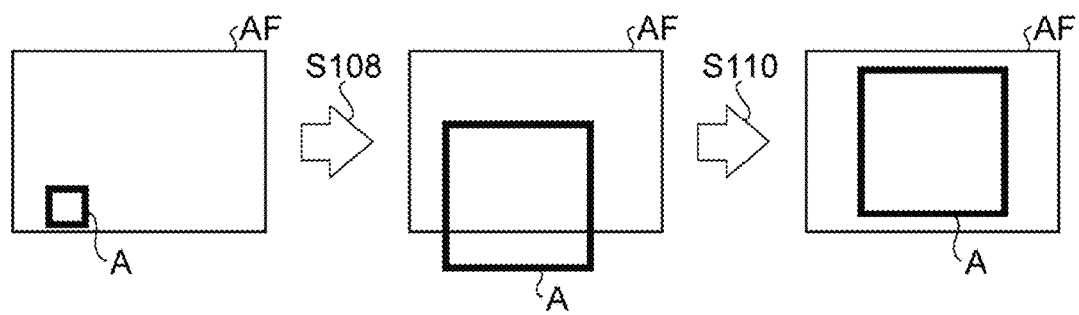
FIG. 13 is a diagram for explaining the operation of YES in step S107 to S110 of FIG. 8.

1.6.1.2 when the Autonomous Moving Body is Too Far from an Attention Region and the Attention Region is not Located at the Center of the Angle of View Next, the operation when the autonomous moving body 1 is too far from the attention region A and the attention region is not located at the center of the angle of view, that is, the operation of YES in step S107 to S110 of FIG. 8 will be described with reference to FIG. 13. As illustrated in FIG. 13, when the autonomous moving body 1 is too far from the attention region A, it is determined that the size of the attention region A is too small for the angle of view of the camera 32 (YES in step S107). In this case, by performing the action decided by the action decision unit 140, the autonomous moving body 1 approaches the attention region A so that the attention region A is kept well within the angle of view AF of the camera 32 (step S108).

Then, it is determined that the attention region A is not located at the center or substantially the center of the angle of view of the camera 32 (NO in step S109). For this determination, by performing the action decided by the action decision unit 140, the roll angle (R), the pitch angle (P), the yaw angle (Y), etc. of the camera 32 are controlled so that the center of the attention region A, or the position with the highest attention level in the attention region A is located at the center or substantially the center of the angle of view AF of the camera 32, (step S110).

1.6.1.3 Attention Region Setting Process

Figure 14:
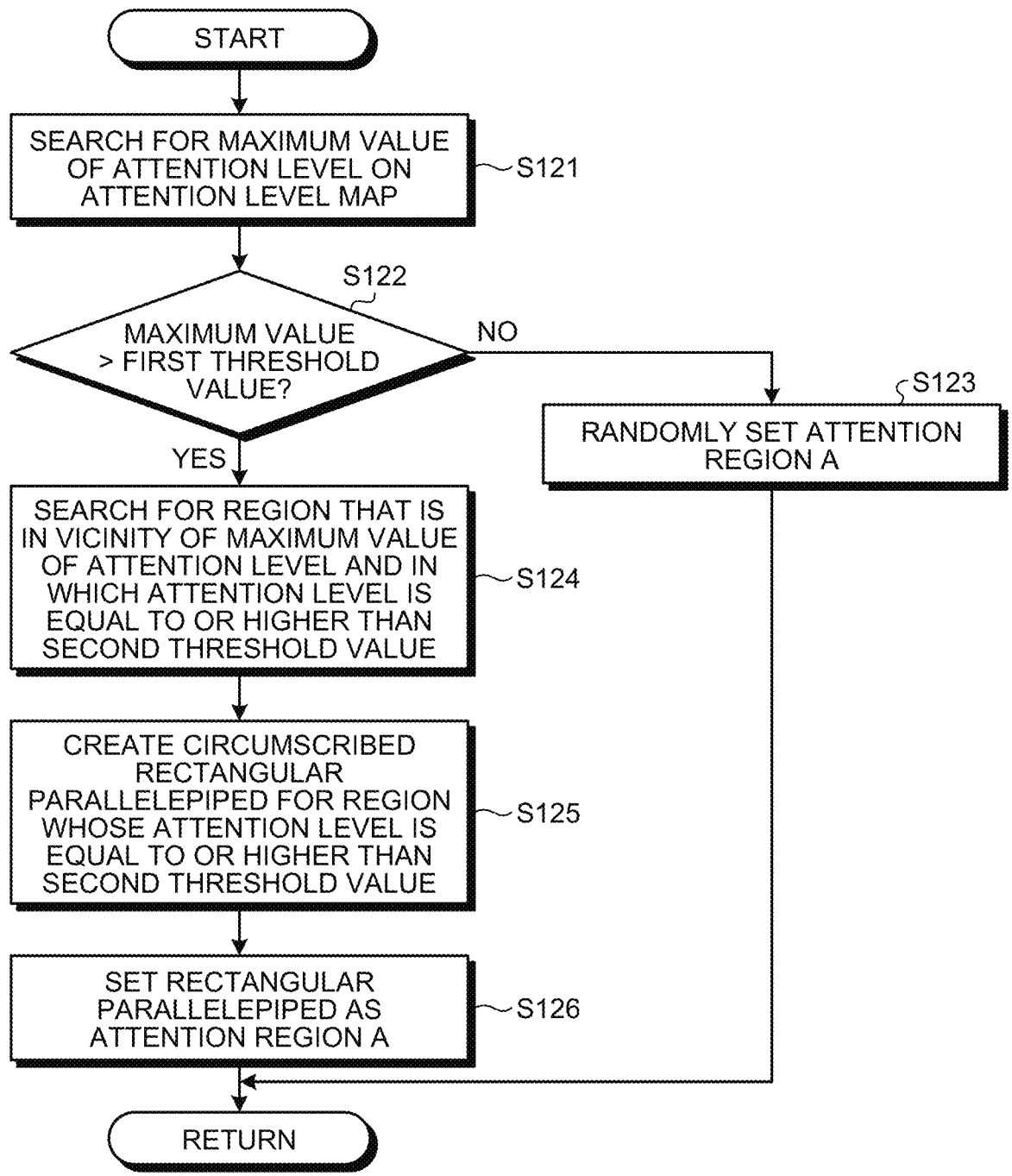
FIG. 14 is a flowchart illustrating an example of an attention region setting operation according to the embodiment of the present disclosure.

Next, the operation (attention region setting operation) when setting the attention region with a high attention level to the attention region A, which is illustrated in step S103 of FIG. 8, will be described in detail with reference to the drawings. FIG. 14 is a flowchart illustrating an example of the attention region setting operation according to the present embodiment. As illustrated in FIG. 14, in this operation, the action decision unit 140 first searches for the maximum value of the attention level in the attention level map 40 acquired in step S101 of FIG. 8 (step S121).

Next, the action decision unit 140 determines whether the maximum value of the searched attention level is larger than a preset first threshold value (step S122), and when it is larger (YES in step S122), the process proceeds to step S124. On the other hand, when the maximum value of the attention level is equal to or less than the first threshold value (NO in step S122), the action decision unit 140 sets a region randomly selected from the predetermined space SP of the attention level map 40 as the attention region A (step S123), and the process returns to the operation illustrated in FIG. 8.

In step S124, the action decision unit 140 searches for a region that is in the vicinity of the maximum value of the attention level and in which the attention level is equal to or higher than a second threshold value. The second threshold value may be lower than the first threshold value. Subsequently, the action decision unit 140 creates a circumscribed rectangular parallelepiped for the region specified in step S124 (step S125), and sets the created circumscribed rect-angular parallelepiped as the attention region A (step S126). After that, the action decision unit 140 returns the process to the operation illustrated in FIG. 8.

The action decision unit 140 may skip step S124 and return the process to the operation illustrated in FIG. 8 instead of setting the region randomly selected in step S123 as the attention region A. In this case, for example, the attention region A set in the attention region setting process in the previous action phase may be continuously used.

1.6.1.4 Specific Example of Attention Region Setting Process

Here, the attention region setting process illustrated in FIG. 14 will be described in detail with reference to a specific example. In the following, for the sake of simplification of the explanation, a two-dimensional attention level map 41 will be illustrated as the attention level map 40. The attention level map 41 has a configuration in which, for example, the attention level is set for respective cells (also referred to as a square) in a grid map 43.

Figures 15, 16, 17:
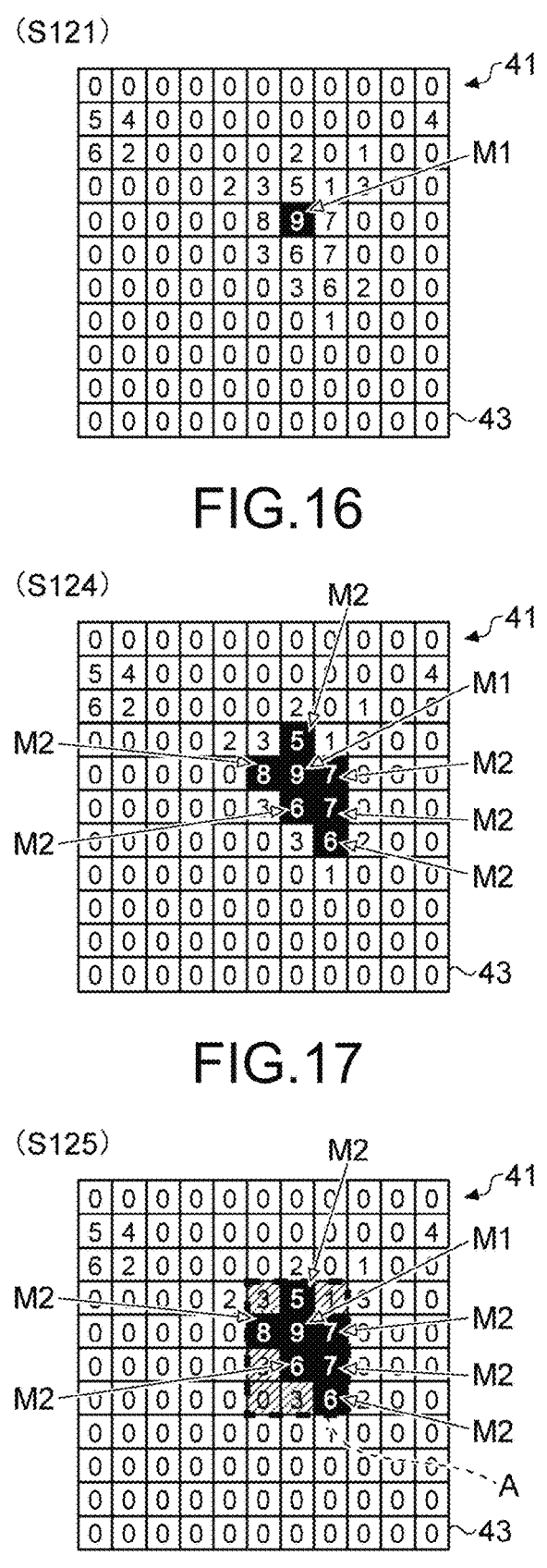

FIG. 15 is a diagram for explaining step S121 in FIG. 14. As illustrated in FIG. 15, in step S121 of FIG. 14, the action decision unit 140 searches for respective cells of the attention level map 41 to specify a first cell M1 for which the attention level with the maximum value is set.

FIG. 16 is a diagram for explaining step S124 in FIG. 14. As illustrated in FIG. 16, in step S124 of FIG. 14, the action decision unit 140 searches for cells around the first cell M1 specified in step S121 to specify second cells M2 whose attention level is equal to or higher than the second threshold value (five or more in the example illustrated in FIG. 16). The region to be searched for may be, for example, a region from the first cell M1 to a predetermined number of cells (cells with three in the example illustrated in FIG. 16) set in advance.

FIG. 17 is a diagram for explaining steps S125 and S126 in FIG. 14. As illustrated in FIG. 16, in step S124 of FIG. 14, the action decision unit 140 creates a rectangular region that borders the outer edge of the regions of the first cell M1 and the second cell M2 specified as described above and that includes the regions (a rectangular parallelepiped region for the three-dimensional attention level map 40). Then, the action decision unit 140 sets this rectangular region as the attention region A in step S125 of FIG. 14.

1.6.2 Recognition Phase (Attention Level Map Creation/Update)

Figure 18:
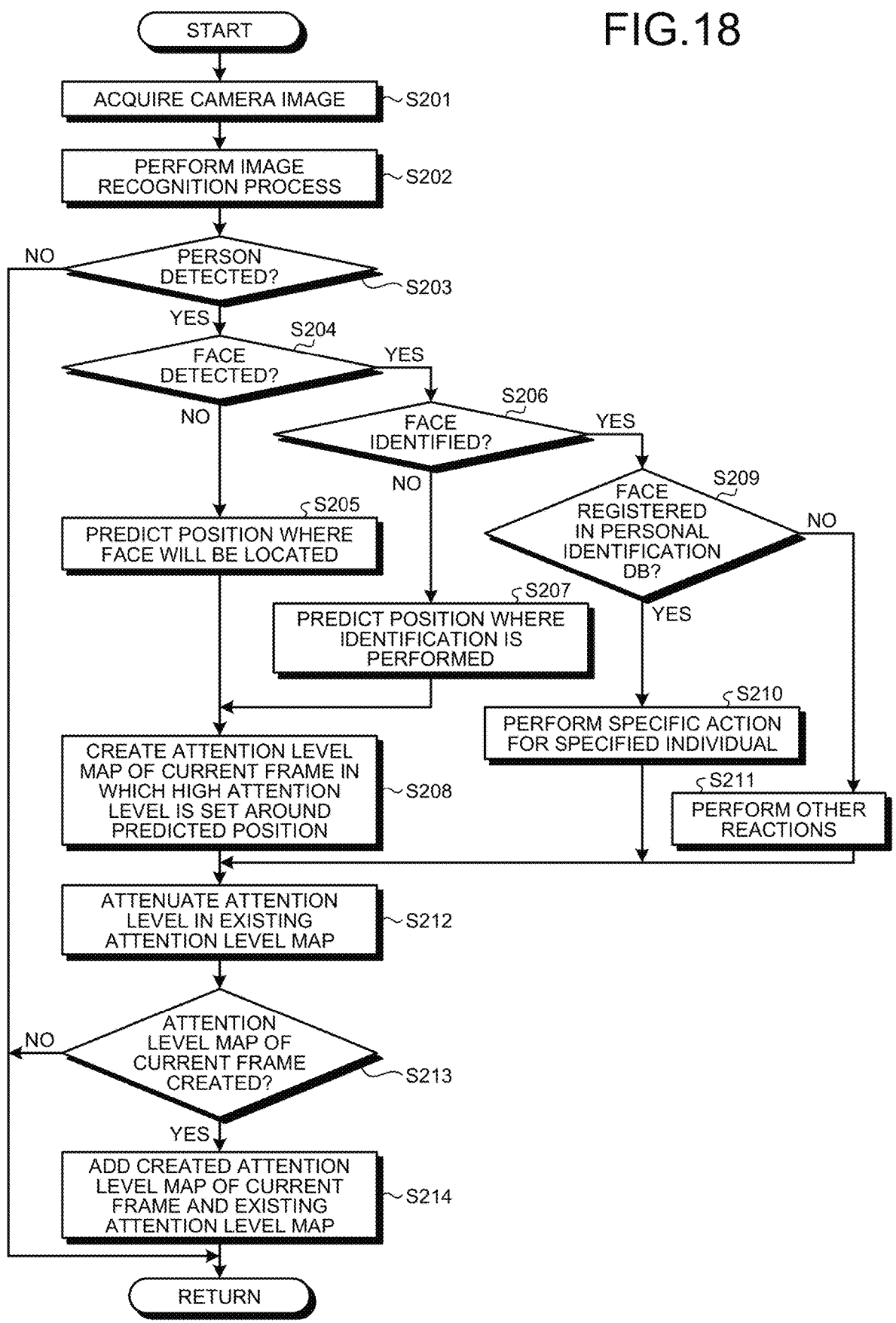
FIG. 18 is a flowchart illustrating an example of a flow of a recognition phase according to the embodiment of the present disclosure.

Next, the recognition phase (attention level map creation/update) illustrated in step S200 of FIG. 7 will be described in detail with reference to the drawings. FIG. 18 is a flowchart illustrating an example of the flow of the recognition phase according to the present embodiment. In addition, in FIG. 18, step S201 is a step performed by the sensor group 110, steps S202 to S204, S206 and S209 are steps performed by the object detection/recognition unit 120, steps S205, S207, S208, and S212 to S214 are steps performed by the attention level map creation/update unit 130, and steps S210 and S211 are steps performed by the interaction execution unit 150.

As illustrated in FIG. 18, in the recognition phase, first, the camera 32 of the sensor group 110 inputs the acquired image data to the object detection/recognition unit 120 (step S201). Next, the object detection/recognition unit 120 performs image recognition process (corresponding to the recognition process 122 in FIG. 4, the face detection 221 in FIG. 6, the face identification 222, the personal identification 223, the human body detection (including part of it) 226, etc.) for the input image data (step S202).

Next, the object detection/recognition unit 120 determines whether a person has been detected as a result of the image recognition process (corresponding to the human body detection (including part of it) 226) in step S202 (step S203). When no person is detected (NO in step S203), this operation returns to the operation illustrated in FIG. 7.

Figure 19:
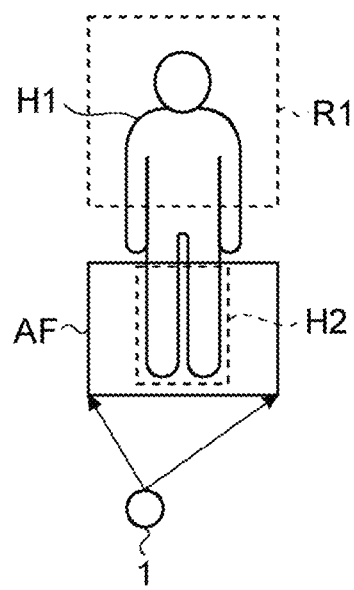
FIG. 19 is a diagram for explaining step S205 in FIG. 18.

On the other hand, when a person is detected (YES in step S203), the object detection/recognition unit 120 determines whether a human face has been detected as a result of the image recognition process (corresponding to the face detection 221) in step S202 (step S204). When no human face is detected (NO in step S204), the attention level map creation/update unit 130 predicts the position (which may include the direction) where the human face will be located in the attention level map 40 from part of the person and the like detected in the image recognition process (corresponding to the human body detection (including part of it) 226) in step S202 (step S205), and the process proceeds to step S208. For example, as illustrated in FIG. 19, when the part of a leg H2 of a human H1 is detected by the image recognition process (corresponding to the human body detection (including part of it) 226) in step S202, the head of the human H1 is usually located above the leg H2. Therefore, in step S205, assuming that the head is above the detected leg H2, a position (or region) R1 where the human face will be located in the predetermined space SP is predicted.

On the other hand, when a human face is detected (YES in step S204), the object detection/recognition unit 120 determines whether the human face can be identified as a result of the image recognition process (corresponding to the face identification 222) in step S202 (step S206). When the human face cannot be identified (NO in step S206), the attention level map creation/update unit 130 predicts the position (which may include the direction) where the human face can be identified in the attention level map 40 from the position and the orientation of the person's part or face detected in the image recognition process (corresponding to the human body detection (including part of it) 226 or face detection 221) in step S202 (step S207), and the process proceeds to step S208.

On the other hand, when the human face can be identified (YES in step S206), the object detection/recognition unit 120 can refer to the personal identification DB 102 to determine whether the individual with the identified face is registered in the personal identification DB 102 (step S209). When the face is registered in the personal identification DB 102 (YES in step S209), the interaction execution unit 150 refers to the specific action rule DB 105 to perform the specific action 152 (see FIG. 4) according to the current situation, etc. for the individual specified from the personal identification DB 102 (step S210), and then this operation proceeds to step S212. On the other hand, when the face is not registered in the personal identification DB 102 (NO in step S209), the interaction execution unit 150 refers to the specific action rule DB 105 to perform the specific action 152 (see FIG. 4) according to the current situation, etc. for an unknown individual (step S211), and then this operation proceeds to step S212.

Figure 20:
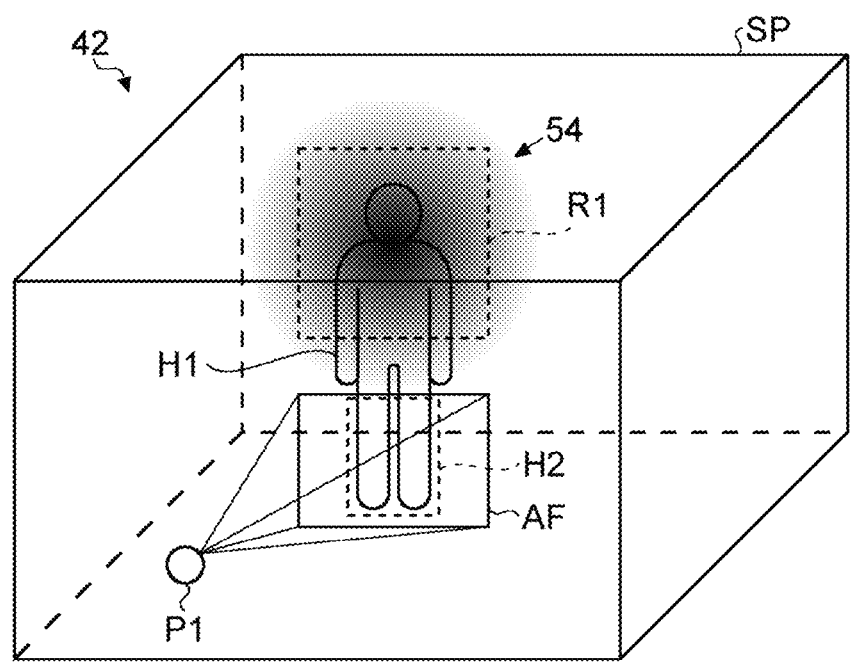
FIG. 20 is a diagram for explaining step S208 in FIG. 18.

In step S208, the attention level map creation/update unit 130 creates an individual attention level map 42 of the current frame in which a high attention level is set around the position predicted in step S205 or S207. Then, this operation proceeds to step S212. For example, as illustrated in FIG. 19, in step S205, assuming the head is above the detected leg H2, when the position (or region) R1 where the human face will be located in the attention level map 40 is predicted, as illustrated in FIG. 20, the individual attention level map 42 of the current frame including a distribution 54 with a three-dimensional Gaussian distribution shape with a local peak of attention level at the predicted position R1 (or the center of the region) is created as the individual attention level map 42 of the current frame. The current frame corresponds to the latest image data acquired immediately before, for example, in the case of image data acquired by the camera 32. Further, the current frame corresponds to the latest voice data acquired in the immediately preceding predetermined period, for example, in the case of voice data acquired by the microphone 31.

In step S212, the attention level attenuation unit 139 (see FIG. 4) of the attention level map creation/update unit 130 performs the attenuation process of the attention level according to a predetermined rule with respect to the attention level map 40 stored in the attention level map DB 103. Next, the attention level map creation/update unit 130 determines whether an individual attention level map of the current frame has been created in step S208 (step S213), and when it is created (NO in step S213), this operation returns to the operation illustrated in FIG. 7.

On the other hand, when the individual attention level map 42 of the current frame is created (YES in step S213), the attention level map creation/update unit 130 adds the individual attention level map 42 of the current frame to the attention level map 40 in the attention level map DB (step S214), and then this operation returns to the operation illustrated in FIG. 7. In addition, when adding the individual attention level map 42 of the current frame to the attention level map 40 in the attention level map DB, for example, the attention level of the corresponding cell (the box cell in the case of a three-dimensional attention level map) in the attention level map 40 and the individual attention level maps 42 of the current frame may be added.

1.6.2.1 from Attention Level Attenuation Process to Adding Individual Attention Level Map of the Current Frame to Existing an Attention Level Map Here, the operation from steps S212 to S214 in FIG. 18, that is, the operations from the attention level attenuation process (S212) to the process of adding the individual attention level map of the current frame to the existing attention level map (S214), will be described using a specific example. In this explanation, it is assumed that the attention level map 40 illustrated in FIG. 5 is stored in the attention level map DB 103, and the individual attention level map 42 illustrated in FIG. 20 is created in step S208 of FIG. 18. Further, in the following explanation, for the sake of simplicity, the three-dimensional attention level map will be replaced with the two-dimensional attention level map. In this case, the three-dimensional attention level map 40 illustrated in FIG. 5 is replaced with the two-dimensional attention level map 40 illustrated in the upper part of FIG. 22, and the three-dimensional individual attention level map 42 illustrated in FIG. 20 is replaced with a two-dimensional individual attention level map 42a illustrated in FIG. 21.

In this operation, the region corresponding to the distribution 51 in FIG. 5 is set as the attention region A by the action phase illustrated in FIG. 8. Therefore, in step S212 of FIG. 18, as illustrated in FIG. 22, for example, the attention level of the region corresponding to the distribution 51 processed in the action phase is attenuated according to a predetermined rule. As a result, as illustrated in an attention level map 40*a* illustrated in the lower part of FIG. 22, the distribution 51 is attenuated to a distribution 51*a* having a lower attention level. The predetermined rule may be a rule to, for example, attenuates the attention level of the corresponding region to a predetermined ratio (for example, half).

Figure 23:
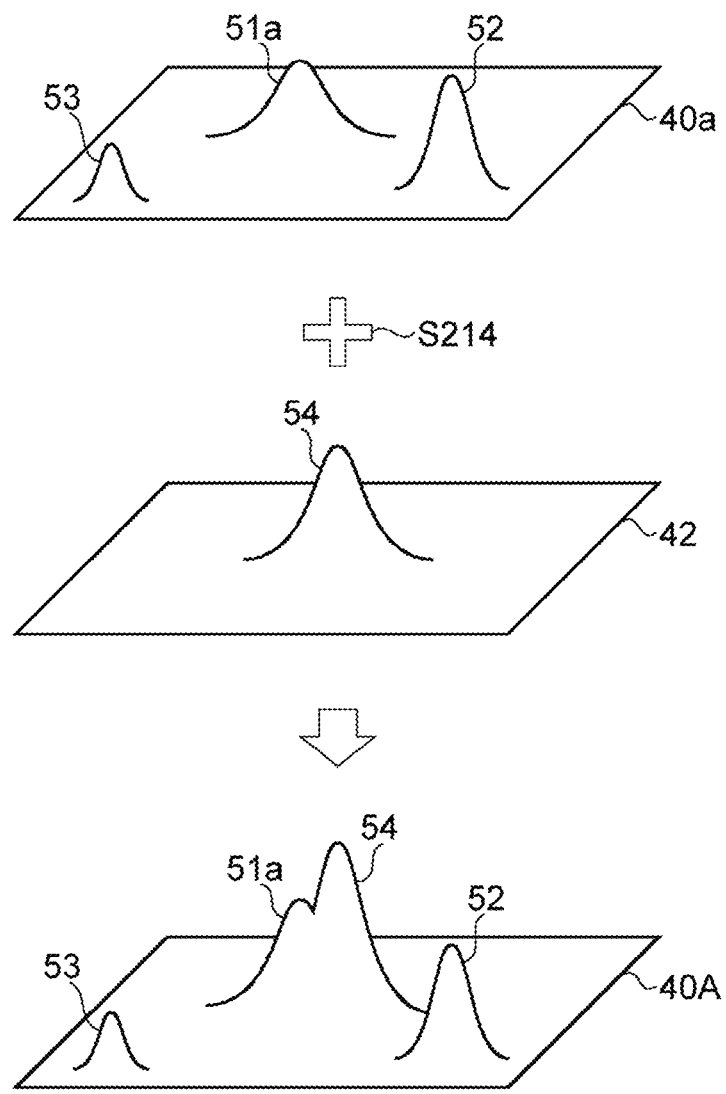
FIG. 23 is a diagram for explaining step S214 in FIG. 18.

Then, in step S214 of FIG. 18, as illustrated in FIG. 23, the attenuated attention level map 40*a* and the individual attention level maps 42 of the current frame are added. As a result, as illustrated at the bottom of FIG. 23, a new attention level map 40A is created by combining the attenuated attention level map 40*a* with the individual attention level maps 42 of the current frame, and is stored in the attention level map DB 103.

As a rule to attenuate the attention level map 40 in the attention level map DB 103, it is possible to apply various rules such as a rule to attenuate the attention level of the entire attention level map 40 every time a predetermined time elapses, and a rule to significantly attenuate the attention level of the region in which the attention level was checked in the action phase but there was nothing to pay attention to, in addition to the rule to attenuate the attention level of the confirmed region as described above.

1.6.3 Other Examples of Operation of Autonomous System

In the above, an example in which the sensor used in the sensor group 110 is the camera 32, and the autonomous system 100 performs the operation with respect to the image data acquired by the camera 32 has been explained. In the following, an example in which the sensor used in the sensor group 110 is the microphone 31, and the autonomous system 100 performs the operation with respect to the voice data acquired by the microphone 31 will be described.

In the above, since the operation of the action phase described with reference to FIGS. 7 to 17 can be basically applied even when the sensor used is the microphone 31, the duplicate description will be omitted.

Figure 24:
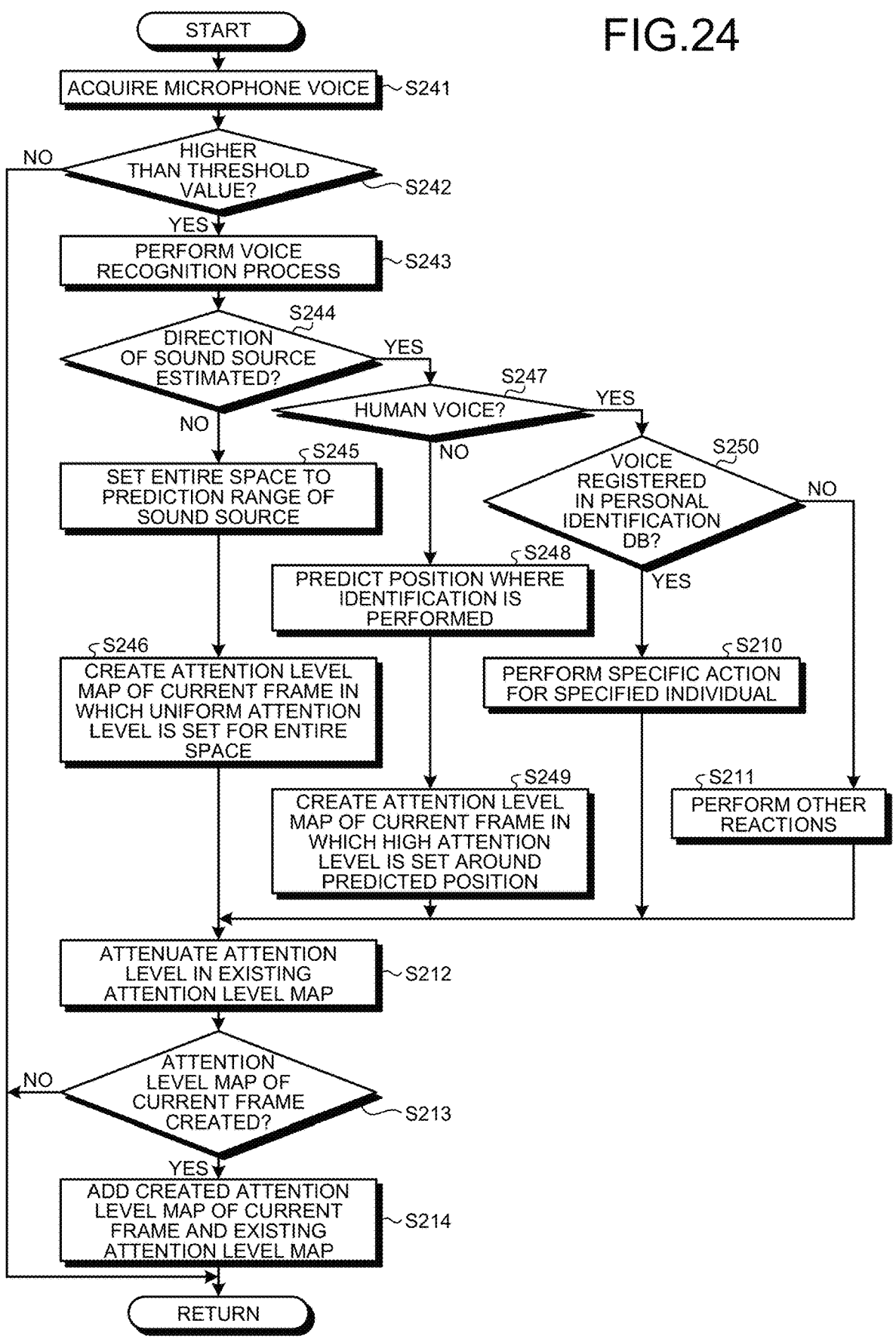
FIG. 24 is a flowchart illustrating an example of another flow of the recognition phase according to the embodiment of the present disclosure.

FIG. 24 is a flowchart illustrating an example of the flow of the recognition phase (attention level map creation/update) when the sensor used is a microphone. In the operation illustrated in FIG. 24, detailed description of the same steps as those illustrated in FIG. 18 will be omitted by quoting them.

As illustrated in FIG. 24 in the recognition phase, first, the microphone 31 of the sensor group 110 inputs the acquired voice data to the object detection/recognition unit 120 (step S241). Next, the object detection/recognition unit 120 determines whether the sound volume of the input voice data is equal to or higher than the preset threshold value (step S242), and when it is equal to or less than the threshold value (NO in step S242), this operation returns to the operation illustrated in FIG. 7. On the other hand, when it is higher than the threshold value (YES in step S242), the object detection/recognition unit 120 performs the voice recognition process (corresponding to the recognition process 121 in FIG. 4, the sound source direction detection 227 in FIG. 6, the voice identification 228, the personal identification 223, etc.) for the input voice data (step S243).

Next, the object detection/recognition unit 120 determines whether the direction of the sound source can be estimated as a result of the voice recognition process (corresponding to the sound source direction detection 227) in step S243 (step S244). When the direction of the sound source cannot be estimated (NO in step S244), the attention level map creation/update unit 130 sets the entire space of the attention level map 40 as the prediction range as the position where the sound source may exist (step S245). Subsequently, the attention level map creation/update unit 130 creates, for example, the individual attention level map 42 of the current frame in which a uniform attention level is set for the entire space (step S246), and the process proceeds to step S212.

On the other hand, when the direction of the sound source can be estimated (YES in step S244), the object detection/recognition unit 120 determines whether the sound source is a human as a result of the voice recognition process (corresponding to the voice identification 228) in step S243 (step S247). When it is not a human (NO in step S247), the attention level map creation/update unit 130 predicts a position (which may include direction) where the type of the sound source can be specified based on the result of the voice recognition process (corresponding to the sound source direction detection 227) in step S243 (step S248). Subsequently, the attention level map creation/update unit 130 creates the individual attention level map 42 of the current frame in which a high attention level is set around the predicted position (step S249), and the process proceeds to step S212.

On the other hand, when the sound source is a human (YES in step S247), the object detection/recognition unit 120 refers to the personal identification DB 102 to determine whether an individual having a voiceprint matching the detected voiceprint is registered in the personal identification DB 102 (step S250). When the voiceprint is registered in the personal identification DB 102 (YES in step S250), the interaction execution unit 150 refers to the specific action rule DB 105 in the same manner as the operation illustrated in FIG. 18 to perform the specific action 152 (see FIG. 4) according to the current situation, etc. for the individual specified from the personal identification DB 102 (step S210), and then this operation proceeds to step S212. On the other hand, when the face is not registered in the personal identification DB 102 (NO in step S250), the interaction execution unit 150 refers to the specific action rule DB 105 in the same manner as the operation illustrated in FIG. 18 to perform the specific action 152 (see FIG. 4) according to the current situation, etc. for an unknown individual (step S211), and then this operation proceeds to step S212.

In step S212, as in the operation illustrated in FIG. 18, the attention level attenuation unit 139 of the attention level map creation/update unit 130 attenuates the attention level of the attention level map 40 in the attention level map DB 103 according to a predetermined rule. After that, as in the operation illustrated in FIG. 18, the attention level map creation/update unit 130 determines whether an individual attention level map of the current frame has been created in step S246 or S249 (step S213), and when it is not created (NO in step S213), this operation returns to the operation illustrated in FIG. 7. On the other hand, when the individual attention level map 42 of the current frame is created (YES in step S213), the attention level map creation/update unit 130 adds the individual attention level map 42 of the current frame to the attention level map 40 in the attention level map DB (step S214), and then this operation returns to the operation illustrated in FIG. 7.

1.7 Example of Information Used to Create Attention Level Map

The information (the face detection 221, the face identification 222, the sound source direction detection 227, the voice identification 228, etc.) used to create the attention level map 40 in the above description is just an example, and the information is not limited to this. Therefore, FIG. 25 illustrates an example of information 510 used to create the attention level map, and based on that information, an example of a place 520 where the attention level is raised, and an example of a reason 530 why the attention level is raised.

Figure 25:
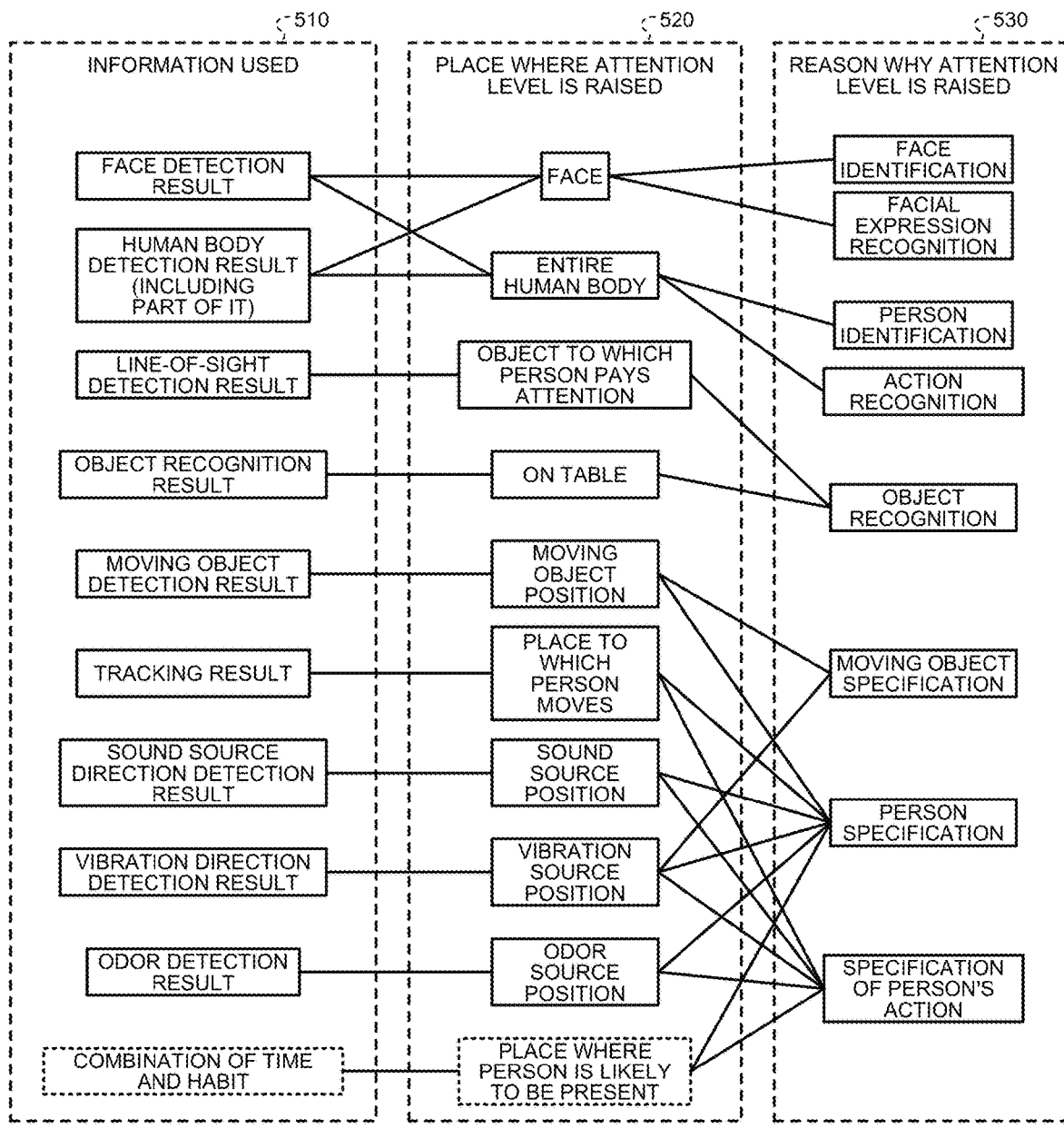
FIG. 25 is a diagram illustrating an example of information used in the embodiment of the present disclosure.

As illustrated in FIG. 25, examples of the information 510 used to create the attention level map 40 include a face detection result, a human body detection result (including part of it), a line-of-sight detection result, an object recognition result, a moving object detection result, a tracking result, a sound source direction detection result, a vibration direction detection result, an odor detection result, a combination of time and habit, etc.

The face detection result may be the result of the face detection 221. The human body detection result (including part of it) may be the result of the human body detection (including part of it) 226. The line-of-sight detection result may be the result of the line-of-sight detection 224. The moving object detection result may be the result of the moving object detection 225. The tracking result may be the result of the tracking 229. The sound source direction detection result may be the result of the sound source direction detection 227.

Further, the object recognition result may be the result of, for example, the object recognition performed by the object detection/recognition unit 120 on the image data or the like acquired by the camera 32 or the like. The vibration direction detection result may be the result of, for example, when the sensor group 110 includes a vibration sensor, the object detection/recognition unit 120 specifying the direction of the vibration source from the sensor data acquired by the vibration sensor. The odor detection result may be the result of, for example, when the sensor group 110 includes an odor sensor, when the object detection/recognition unit 120 detects a specific odor from the sensor data acquired by the odor sensor. The combination of time and habit may be information, for example, on a person's habits obtained by accumulating the person's action specified on the basis of the sensor data acquired by each sensor in the sensor group 110 with time information, and directly obtaining from this accumulated sensor data or performing statistical processing.

The place 520 where the attention level is raised based on the face detection result or the human body detection result (including part of it) may be a place where the face is located, a place where the entire human body is located, or the like. The reason 530 why the attention level of the place where the face is located is raised is because, for example, the sensor group 110 acquires the image data including the face, and the object detection/recognition unit 120 performs the face identification and the facial expression identification for the image data. The reason 530 why the attention level of the place where the entire human body is located is raised is because, for example, the sensor group 110 acquires the image data including the entire human body, and the object detection/recognition unit 120 performs the human identification and the action recognition of recognizing the person's action for the image data.

The place 520 where the attention level is raised based on the line-of-sight detection result may be a place where an object to which a person is paying attention is located, or the like. The reason 530 why the attention level of the place where the object to which the person is paying attention is located is raised is because, for example, the sensor group 110 acquires the image data including the object to which the person is paying attention, and the object detection/recognition unit 120 performs the object recognition for the image data.

The place 520 where the attention level is raised based on the object recognition result may be a place where the object is located, such as on a table, or the like. The reason 530 why the attention level of the place where the object is located, such as on the table, is raised is because, for example, the sensor group 110 acquires the image data including the place where the object is located, such as on the table, and the object detection/recognition unit 120 performs the object recognition for the image data.

The place 520 where the attention level is raised based on the moving object detection result may be a place where the moving object is located, or the like. The reason 530 why the attention level of the place where the moving object is located is raised is because, for example, the sensor group 110 acquires the image data including the moving object, and the object detection/recognition unit 120 specifies the moving object or the person based on the image data.

The place 520 where the attention level is raised based on the tracking result may be a place to which the person moves, or the like. The reason 530 why the attention level of the place to which the person moves is raised is because, for example, the sensor group 110 acquires the image data including the place to which the person moves, and the object detection/recognition unit 120 specifies the person or the person's action based on the image data.

The place 520 where the attention level is raised based on the sound source direction detection result may be a place where the sound source is located, or the like. The reason 530 why the attention level of the place where the sound source is located is raised is because, for example, the sensor group 110 acquires the image data including the sound source, and the object detection/recognition unit 120 specifies the person or the person's action based on the image data.

The place 520 where the attention level is raised based on the vibration direction detection result may be a place where the vibration source is located, or the like. The reason 530 why the attention level of the place where the vibration source is located is raised is because, for example, the sensor group 110 acquires the image data including the vibration source, and the object detection/recognition unit 120 specifies the moving object, the person, or the person's action based on the image data.

The place 520 where the attention level is raised based on the odor detection result may be a place where the odor source is located, or the like. The reason 530 why the attention level of the place where the odor source is located is raised is because, for example, the sensor group 110 acquires the image data including the sound source, and the object detection/recognition unit 120 specifies the person or the person's action based on the image data.

The place 520 where the attention level is raised based on the combination of time and habit may be a place where a person is likely to be present, or the like. The reason 530 why the attention level of a place where a person is likely to be present is raised is because, for example, the sensor group 110 acquires the image data including the person, and the object detection/recognition unit 120 specifies the person or the person's action based on the image data.

1.8 Action/Effect

As mentioned above, according to the present embodiment, the attention level map 40 is updated sequentially based on the sensor data acquired by the sensor group 110, and the next action of the autonomous moving body 1 is decided based on attention level map 40, so that it is possible to more accurately set the place or the region to which the autonomous moving body 1 should pay attention as the attention region A according to the situation and the communication partner. As a result, it is possible to carry out more natural communication and interaction.

Moreover, in the present embodiment, the attention level of the attention level map 40 is attenuated based on confirmed regions, time lapse, etc., so that it is possible to more accurately set the place or the region to which the autonomous moving body 1 should pay attention as the attention region A according to the current situation. As a result, it is possible to carry out more natural communication and interaction.

Moreover, in the present embodiment, the individual attention level map 42 of the current frame is created using the sensor data acquired by one or a plurality of sensors, and this individual attention level map 42 is added to the attention level map 40, so that it is possible to easily create the attention level map 40 that integrates a plurality of events.

1.9 Modification

In the above-described embodiment, the case where the action phase and the recognition phase are alternately performed has been illustrated, but the operation is not limited to such an operation. For example, the action phase and the recognition phase may be performed alternately, and at a certain point in time, the action phase may be repeatedly performed a predetermined number of times in succession. However, even in this case, it is preferable to perform a process of attenuating the attention level of the confirmed region in the attention level map 40 according to a predetermined rule after each action phase.

Further, in the above-described embodiment, although the case where a high attention level is set at the place or the region to which the autonomous moving body 1 should pay attention in attention level map 40 is illustrated, the configuration is not limited to this. For example, it is possible to have a configuration in which a high attention level is set at the place where the autonomous moving body 1 should be located. In this case, the attention level map 40 can function as an operation map in which a series of operations of the autonomous moving body 1 is registered. The autonomous moving body 1 operates so as to sequentially follow the positions of the high attention level in the attention level map 40.

Further, in the above-described embodiment, the case where the action phase and the recognition phase are performed as a series of operations (same thread) is illustrated, but this is not limited, and for example, the action phase and the recognition phase may be performed independently as multitasking threads or processes. In this case, in the action phase, an interrupt may be generated by a sudden event having a high attention level.

When the action phase and the recognition phase are performed independently as multitasking threads or processes, the specific action 152 performed in step S210 or S211 of FIG. 18 or FIG. 24 may be performed continuously, for example, for a period of time. In this case, the recognition phase may not be performed for the duration of the specific action 152, the execution cycle of the recognition phase maybe lowered, or it may be possible to avoid setting the attention region A by temporarily raising the first threshold value (see step S122 of FIG. 14) when deciding the attention region A.

Further, the attention level map 40 or the attention level map DB 103 exemplified in the above-described embodiment may be shared by a plurality of autonomous moving bodies 1A to 1N.

Further, the attention level set in each box cell of the attention level map 40 may be a scalar value or a vector value. For example, in the box cell corresponding to the position of the human face, a vector value having the orientation of the human face may be set as the attention level.

In addition, attribute information may be added to the attention level set in each box cell. This attribute information can include, for example, a source attribute, a result attribute, a time coefficient, and the like.

The source attribute is information about the sensor that acquires the sensor data used in the calculation of the attention level, and is information indicating, for example, whether the attention level is obtained by performing the recognition process 122 on the image data acquired by the camera 32, or the attention level is obtained by performing the recognition process 121 on the voice data acquired by the microphone 31. By adding such a source attribute, for example, when the action decision unit 140 decides an action (action decision 142 in FIG. 4), it is possible to have a configuration to change the action to be decided according to the source attribute. For example, when the source attribute indicates that the attention level is obtained by performing the recognition process 122 on the image data acquired by the camera 32, the action decision unit 140 can decide, in the action decision 142, the action to move the autonomous moving body 1 to a position suitable for capturing an image by the camera 32. In addition, when the source attribute indicates that the attention level is obtained by performing the recognition process 121 on the voice data acquired by the microphone 31, the action decision unit 140 can decide, in the action decision 142, the action to move the autonomous moving body 1 to a position suitable for collecting sound by the microphone 31 or a position at which it is possible to both collect sound by the microphone 31 and capture an image by the camera 32.

The result attribute is information about the origin of the attention level, and is information indicating, for example, whether the attention level is an attention level related to a fun event, an attention level related to a scary event, or an attention level related to a dangerous event. By adding such a result attribute, it is possible to have a configuration to change the action to be decided according to the result attribute, for example, when the action decision unit 140 decides an action (action decision 142 in FIG. 4). For example, when the result attribute indicates that the attention level is an attention level related to a fun event, the action decision unit 140 can decide, in the action decision 142, the action to express fun (for example, shaking the tail). Also, when the result attribute indicates that the attention level is an attention level related to a scary event, the action decision unit 140 can decide, in the action decision 142, the action to express fear (for example, checking the event far away from it or lowering the tail).

The result attribute is information about the origin of the attention level, and is information indicating, for example, whether the attention level is an attention level related to a fun event, an attention level related to a scary event, or an attention level related to a dangerous event. By adding such a result attribute, it is possible to have a configuration to change the action to be decided according to the result attribute, for example, when the action decision unit 140 decides an action (action decision 142 in FIG. 4). For example, when the result attribute indicates that the attention level is an attention level related to a fun event, the action decision unit 140 can decide, in the action decision 142, the action to express fun (for example, shaking the tail). Also, when the result attribute indicates that the attention level is an attention level related to a scary event, the action decision unit 140 can decide, in the action decision 142, the action to express fear (for example, checking the event far away from it or lowering the tail).

The time coefficient is information on how long the attention level should be continuously paid attention on the set region. By adding such a time coefficient, for example, the degree and frequency of attenuation when the attention level attenuation unit 139 of the attention level map creation/update unit 130 attenuates the attention level in the attention level map 40 can be decided for each box cell. For example, when the attention level comes from a loud sound, it is possible to have a configuration to attenuate the attention level in a relatively short time when the action decision unit 140 does not perform the action for checking immediately after the occurrence.

Further, in the above-described embodiment, the case of creating the individual attention level map 42 of the current frame to raise the attention level of the region of attention is illustrated, but this is not limited, and for example, the individual attention level map 42 of the current frame may be created to lower the attention level of a region to which attention should not be paid or a region to which attention need not be paid. For example, when the action decision unit 140 checks the attention region A but there is no object of attention, the individual attention level map 42 of the current frame may be created to lower the attention level of the attention region A. Such an attention level map can be created by, for example, setting a negative attention level to the attention level of the box cell corresponding to the region whose attention level is to be lowered.

Further, in the above-described embodiment, in the individual attention level map 42 of the current frame, for example, the peak value of the attention level and the distribution of the attention level may be controlled according to the object or the region of attention. For example, when the autonomous moving body 1 has a preference of "liking a pink ball", the distribution of attention level in the region where the pink ball is located in the individual attention level map 42 of the current frame may be the distribution of attention level having a higher peak value than usual. This makes it possible to make the autonomous moving body 1 preferentially show interest in the pink ball. On the contrary, when the autonomous moving body 1 has a preference of "hating an insect", the distribution of attention level in the region where the insect is located in the individual attention level map 42 of the current frame may be the distribution of attention level having a lower peak value than usual or a negative peak value. This makes it possible to make the autonomous moving body 1 act so as not to show interest in insects.

A preference setting such as "liking a pink ball" can be set to the autonomous moving body 1 by, for example, the user using the communication terminal 3 connected to the autonomous moving body 1 directly or via the network 4. This makes it possible to set the autonomous moving body 1 to act according to the user's preference.

In addition, for an object frequently detected by the sensor group 110, the preference may be set for the autonomous moving body 1 automatically or manually as an object which the autonomous moving body 1 likes, or, as an object on which the autonomous moving body 1 has diminished interest (is tired of).

Further, in the above-described embodiment, the update of the attention level map 40 may be performed based on the following equation (1). The following equation (1) is based on the premise that the corresponding box cells are added to each other.

$$\text{Latest attention level map}=(1-\alpha)(\text{current attention level map})+\alpha(\text{individual attention level map of the current frame}) \quad (1)$$

In equation (1), $\alpha$ represents the update rate, for example, a value higher than 0 and less than 1. Therefore, it is possible to adjust the degree of update by adjusting the value of the update rate $\alpha$. For example, when the update rate $\alpha$ is set to a large value, the degree of update is large, and the attention level map 40 changes in a short time. On the other hand, when the update rate a is set to a small value, the degree of update is small, and the attention level map 40 does not change much.

Further, the update rate $\alpha$ may be changed according to the specific action 152 performed by the interaction execution unit 150. For example, when the interaction execution unit 150 is performing the specific action 152 in an absorbed state, or when the interaction execution unit 150 is performing a resting state (including a sleeping state), the update rate a may be changed to a lower value. As a result, it is possible to prevent the autonomous moving body 1 from reacting to a small noise or the like.

Further, the update rate $\alpha$ may be controlled according to the results of the image recognition process (corresponding to the recognition process 122) or the voice recognition process (corresponding to the recognition process 121). For example, when the owner (owner) can be identified as a result of the image recognition process (personal identification 223), the attention level may be not likely to be lowered by reducing the update rate a for the region corresponding to this owner (owner), and in the case of a person other than the owner, the attention level may be likely to be lowered by increasing the update rate $\alpha$ for the region corresponding to this person. At this time, when the person is a person to see for the first time, the update rate $\alpha$ for the region corresponding to this person may be reduced in order to express the vigilance corresponding to this person so that the attention level is not likely to be lowered.

The embodiments of the present disclosure have been described above, the technical scope of the present disclosure is not limited to the above-described embodiments as they are, and various changes can be made without departing from the gist of the present disclosure. Moreover, the components over different embodiments and modifications may be suitably combined.

Further, the effects in each embodiment described in the present specification are merely examples and are not limited, and other effects may be present.

Note that the present technology may also be configured as below.

(1)

An information processing device comprising: an action decision unit that decides, based on an attention level map in which an attention level indicating a degree of attention for each position in a predetermined space is set, an action which a drive mechanism is caused to perform.

(2)

The information processing device according to the (1), wherein the drive mechanism is a movement mechanism that controls at least one of a position and an attitude of an autonomous moving body, and the action decision unit causes the drive mechanism to perform the action to control at least one of the position and the attitude of the autonomous moving body.

(3)

The information processing device according to the (1) or (2), further comprising: an update unit that updates the attention level map based on information around the drive mechanism.

(4)

The information processing device according to the (3), further comprising:

a sensor that acquires information around the drive mechanism; and a recognition unit that performs a recognition process on sensor data acquired by the sensor, wherein the update unit updates the attention level map based on a result of the recognition process.

(5)

The information processing device according to the (4), wherein the update unit estimates, based on the result of the recognition process, a region where an attention level in the attention level map is made to be high or low to update the attention level map so that the attention level of the estimated region is made to be high or low.

(6)

The information processing device according to the (5), wherein the update unit creates an individual attention level map in which an attention level is set in the estimated region, and adds the individual attention level map to the attention level map to update the attention level map.

(7)

The information processing device according to any one of the (4) to (6), wherein the sensor includes a camera that images surroundings of the drive mechanism to output image data, the recognition unit performs an image recognition process on the image data, and the update unit updates the attention level map based on a result of the image recognition process.

(8)

The information processing device according to (7) above, in which the image recognition process includes at least one of a human body detection of detecting all or part of a human body included in the image data, a face detection of detecting a human face included in the image data, and a face identification of identifying the human face included in the image data.

(9)

The information processing device according to any one of the (4) to (8), wherein the sensor includes a microphone that inputs a sound propagating in a predetermined space to output voice data, the recognition unit performs a voice recognition process on the voice data, and the update unit updates the attention level map based on a result of the voice recognition process.

(10)

The information processing device according to the (9) above, in which the voice recognition process includes at least one of a sound source direction detection of detecting a direction of a sound source of the sound with respect to the drive mechanism, and a sound source identification of identifying the sound source of the sound.

(11)

The information processing device according to the (4), wherein the sensor includes at least one of a camera, a microphone, a time of flight (ToF) sensor, a motion sensor, a position sensitive detector (PSD), a touch sensor, an illuminance sensor, and an inertial measurement unit.

(12)

The information processing device according to any one of the (1) to (11), wherein the action decision unit specifies a position where an attention level is maximum in the attention level map, sets, as an attention region, a region surrounding the position where the attention level is maximum, and decides, based on the attention region, the action which the drive mechanism is caused to perform.

(13)

The information processing device according to any one of the (1) to (11), further comprising:

a camera provided in the drive mechanism to image surroundings of the drive mechanism to output image data, wherein the action decision unit specifies a position where an attention level is maximum in the attention level map, sets, as an attention region, a region surrounding the position where the attention level is maximum, and decides the action which the drive mechanism is caused to perform so that a region, in the predetermined space, corresponding to the attention region is kept within an angle of view of the camera.

(14)

The information processing device according to any one of the (1) to (11), further comprising:

a camera provided in the drive mechanism to image surroundings of the drive mechanism to output image data, wherein the action decision unit specifies a position where an attention level is maximum in the attention level map, sets, as an attention region, a region surrounding the position where the attention level is maximum, and decides the action which the drive mechanism is caused to perform so that a region, in the predetermined space, corresponding to the attention region is located substantially at a center of an angle of view of the camera.

(15)

The information processing device according to any one of the (1) to (11), wherein the action decision unit specifies a position where an attention level is maximum in the attention level map, sets, as an attention region, a region surrounding the position where the attention level is maximum, and decides the action which the drive mechanism is caused to perform so that the drive mechanism moves to a region, in the predetermined space, corresponding to the attention region.

(16)

The information processing device according to the (2), wherein the drive mechanism includes a swingable head, and the action involves at least one of moving backward, approaching, looking up, and shaking the head.

(17)

The information processing device according to the (2) above, in which the action decision unit specifies a position where an attention level is maximum in the attention level map, sets a region surrounding the position where the attention level is maximum as an attention region, and decides, based on the attention region, the action which the drive mechanism is caused to perform, and the action includes at least one of the autonomous moving body moving away from a region, in the predetermined space, corresponding to the attention region, the autonomous moving body approaching a region, in the predetermined space, corresponding to the attention region, the autonomous moving body looking up at a region, in the predetermined space, corresponding to the attention region, and the autonomous moving body facing a region, in the predetermined space, corresponding to the attention region.

(18)

The information processing device according to any one of the (3) to (11), wherein the update unit includes an attenuation unit that attenuates an attention level in the attention level map based on a predetermined condition.

(19)

The information processing device according to the (18), wherein the action decision unit specifies a position where an attention level is maximum in the attention level map, sets, as an attention region, a region surrounding the position where the attention level is maximum, and decides, based on the attention region, the action which the drive mechanism is caused to perform, and the attenuation unit attenuates an attention level of the attention region after the drive mechanism performs the action.

(20)

The information processing device according to the (18) or (19), wherein the attenuation unit attenuates an attention level of the attention level map each time a predetermined time elapses.

(21)

The information processing device according to any one of the (1) to (20), further comprising: an execution unit that performs a specific action in response to an occurrence of a specific event.

(22)

The information processing device according to the (21) above, in which the specific action includes at least one of an action similar to that of an animal or a creature, communication with a user, a play, and an emotional expression.

(23)

An information processing system including an action decision unit that decides, based on an attention level map in which an attention level indicating a degree of attention for each position in a predetermined space is set, an action which a drive mechanism is caused to perform.

(24)

An action decision method comprising deciding, based on an attention level map in which an attention level indicating a degree of attention for each position in a predetermined space is set, an action which a drive mechanism is caused to perform.

(25)

A program causing a computer to decide, based on an attention level map in which an attention level indicating a degree of attention for each position in a predetermined space is set, an action which a drive mechanism is caused to perform.

REFERENCE SIGNS LIST 1, 1A to 1N autonomous moving body
2 server
3 communication terminal
10 control unit
11 signal processing circuit
12 CPU
13 DRAM
14 flash ROM
15 PC card I/F
16 wireless communication unit
17 internal bus
18 battery
19 memory card
21 display
22 speaker
23 encoder (potentiometer)
24 actuator
25 movable unit
30 other sensors
31 microphone
32 camera
33 ToF sensor
34 motion sensor
35 PSD
36 touch sensor
37 illuminance sensor
38 sole button
39 IMU
40, 40A, 41 attention level map
42 individual attention level map of the current frame
100 autonomous system
102 personal identification DB
103 attention level map DB
104 action rule DB
105 specific action rule DB
110 sensor group
120 object detection/recognition unit
121 to 124 recognition process
130 attention level map creation/update unit
131 to 134 attention region prediction
135 to 138 attention level map creation
139 attention level attenuation unit
140 action decision unit
141 attention region decision
142 action decision
143 action
150 interaction execution unit
151 event occurrence detection
152 specific action
221 face detection
222 face identification
223 personal identification
224 line-of-sight detection
225 moving object detection
226 human body detection (including part of it)
227 sound source direction detection
228 voice identification
229 tracking
241 looking up/shaking head (directing the camera in any direction)
242 approaching/moving backward (moving in any direction)
243 controlling camera zoom/focus
244 zoom homing microphone
251 action similar to action of an animal or the like 252 communication
253 play
254 emotional expression
A attention region
AF angle of view
SP predetermined space

The invention claimed is:

1. An information processing device comprising:
an action decision unit configured to
decide, based on an attention level map in which an attention level is set indicating a degree of attention for each position in a predetermined space, an action which a drive mechanism is caused to perform, and cause the drive mechanism to perform the action,
wherein the attention level map includes a time coefficient associated with the attention level set for each position in the predetermined space, and
wherein the action decision unit is implemented via at least one processor.

2. The information processing device according to claim 1,
wherein the drive mechanism includes a movement mechanism configured to control at least one of a position or an attitude of an autonomous moving body, and
wherein the action decision unit causes the drive mechanism to perform the action to control the at least one of the position or the attitude of the autonomous moving body.

3. The information processing device according to claim 1, further comprising:
an update unit configured to update the attention level map based on information around the drive mechanism,
wherein the update unit is implemented via at least one processor.

4. The information processing device according to claim 3, further comprising:
a sensor that acquires information around the drive mechanism; and
a recognition unit configured to perform a recognition process on sensor data acquired by the sensor,
wherein the update unit updates the attention level map based on a result of the recognition process, and
wherein the recognition unit is implemented via at least one processor.

5. The information processing device according to claim 4,
wherein the update unit is further configured to estimate, based on the result of the recognition process, a region where an attention level in the attention level map is made to be high or low to update the attention level map so that the attention level of the estimated region is made to be high or low.

6. The information processing device according to claim 5,
wherein the update unit is further configured to
create an individual attention level map in which an attention level is set in the estimated region, and
add the individual attention level map to the attention level map to update the attention level map.

7. The information processing device according to claim 4,
wherein the sensor includes a camera configured to image surroundings of the drive mechanism to output image data,
wherein the recognition unit performs the recognition process including an image recognition process on the image data, and
wherein the update unit updates the attention level map based on a result of the image recognition process.

8. The information processing device according to claim 4,
wherein the sensor includes a microphone configured to input a sound propagating in a predetermined space to output voice data,
wherein the recognition unit performs the recognition process including a voice recognition process on the voice data, and
wherein the update unit updates the attention level map based on a result of the voice recognition process.

9. The information processing device according to claim 4,
wherein the sensor includes at least one of a camera, a microphone, a time of flight (ToF) sensor, a motion sensor, a position sensitive detector (PSD), a touch sensor, an illuminance sensor, or an inertial measurement unit.

10. The information processing device according to claim 1,
wherein the action decision unit is further configured to
specify a position where an attention level is maximum in the attention level map,
set, as an attention region, a region surrounding the position where the attention level is set to a maximum degree of attention, and
decide, based on the attention region, the action which the drive mechanism is caused to perform.

11. The information processing device according to claim 1, further comprising:
a camera provided in the drive mechanism and configured to image surroundings of the drive mechanism to output image data,
wherein the action decision unit is further configured to
specify a position where an attention level is maximum in the attention level map,
set, as an attention region, a region surrounding the position where the attention level is set to a maximum degree of attention, and
decide the action which the drive mechanism is caused to perform so that a region, in the predetermined space, corresponding to the attention region is kept within an angle of view of the camera.

12. The information processing device according to claim 1, further comprising:
a camera provided in the drive mechanism and configured to image surroundings of the drive mechanism to output image data,
wherein the action decision unit is further configured to
specify a position where an attention level is maximum in the attention level map,
set, as an attention region, a region surrounding the position where the attention level is set to a maximum degree of attention, and
decide the action which the drive mechanism is caused to perform so that a region, in the predetermined space, corresponding to the attention region is located substantially at a center of an angle of view of the camera.

13. The information processing device according to claim 1,
 wherein the action decision unit is further configured to
  specify a position where an attention level is maximum in the attention level map,
  set, as an attention region, a region surrounding the position where the attention level is set to a maximum degree of attention, and
  decide the action which the drive mechanism is caused to perform so that the drive mechanism moves to a region, in the predetermined space, corresponding to the attention region.

14. The information processing device according to claim 2,
 wherein the drive mechanism includes a head configured to be swingable, and
 wherein the action involves at least one of moving backward, approaching, looking up, or shaking the head.

15. The information processing device according to claim 3,
 wherein the update unit includes an attenuation unit configured to attenuate at least one attention level set in the attention level map based on a predetermined condition.

16. The information processing device according to claim 15,
 wherein the action decision unit is further configured to
  specify a position where an attention level is maximum in the attention level map,
  set, as an attention region, a region surrounding the position where the attention level is set to a maximum degree of attention, and
  decide, based on the attention region, the action which the drive mechanism is caused to perform, and
  the attenuation unit attenuates an attention level of the attention region after the drive mechanism performs the action.

17. The information processing device according to claim 15,
 wherein the attenuation unit attenuates the at least one attention level of the attention level map each time a predetermined time elapses.

18. The information processing device according to claim 1, further comprising:
 an execution unit configured to perform a specific action in response to an occurrence of a specific event,
 wherein the execution unit is implemented via at least one processor.

19. An action decision method comprising:
 deciding, based on an attention level map in which an attention level is set indicating a degree of attention for each position in a predetermined space, an action which a drive mechanism is caused to perform; and
 causing the drive mechanism to perform the action,
 wherein the attention level map includes a time coefficient associated with the attention level set for each position in the predetermined space.

20. A non-transitory computer-readable storage medium having embodied thereon a program, which when executed by a computer causes the computer to execute a method, the method comprising:
 deciding, based on an attention level map in which an attention level is set indicating a degree of attention for each position in a predetermined space, an action which a drive mechanism is caused to perform; and
 causing the drive mechanism to perform the action,
 wherein the attention level map includes a time coefficient associated with the attention level set for each position in the predetermined space.

* * * * *